US011431890B2

(12) United States Patent
Rodriguez, II et al.

(10) Patent No.: US 11,431,890 B2
(45) Date of Patent: Aug. 30, 2022

(54) WEARABLE ELECTRONIC DEVICE WITH HARDWARE SECURED CAMERA

(71) Applicant: Snap Inc., Santa Monica, CA (US)

(72) Inventors: Jonathan M Rodriguez, II, Los Angeles, CA (US); Gerald Nilles, Culver City, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/808,155

(22) Filed: Mar. 3, 2020

(65) Prior Publication Data
US 2020/0314326 A1 Oct. 1, 2020

Related U.S. Application Data

(63) Continuation of application No. 15/692,968, filed on Aug. 31, 2017, now Pat. No. 10,616,470.

(51) Int. Cl.
*H04N 5/232* (2006.01)
*H04N 5/225* (2006.01)
(Continued)

(52) U.S. Cl.
CPC ..... *H04N 5/23216* (2013.01); *G02B 27/0101* (2013.01); *G06F 1/163* (2013.01);
(Continued)

(58) Field of Classification Search
CPC ........ G02B 2027/0138; G02B 27/0101; G02C 11/10; G06F 1/163; G06F 21/83;
(Continued)

(56) References Cited

U.S. PATENT DOCUMENTS 6,731,326 B1   5/2004   Bettinardi
8,154,608 B2   4/2012   Ishii
(Continued)

FOREIGN PATENT DOCUMENTS

CN   111052032 A   4/2020
JP   2012060218 A   3/2012
(Continued)

OTHER PUBLICATIONS

"U.S. Appl. No. 15/692,968, Non Final Office Action dated Jul. 18, 2019", 21 pgs.
(Continued)

*Primary Examiner* — Amy R Hsu
(74) *Attorney, Agent, or Firm* — Schwegman Lundberg & Woessner, P.A.

(57) ABSTRACT

Apparatuses and systems for electronic wearable devices such as smart glasses are described. The wearable device can comprise a housing, an image capture component, a locking component, and a control component. The housing defines an imaging aperture. The image capture component is coupled to the housing and aligned with the imaging aperture. The image capture component is configured to capture image data of a field of view aligned with the imaging aperture. The locking component is coupled to the image capture component. The locking component modifies a capture state of the image capture component to selectively enable image capture in response to a selection releasing the locking component. The control component is coupled to the locking component. Interaction with the control component comprises the selection releasing the locking component and triggering modification of the capture state of the image capture component.

14 Claims, 15 Drawing Sheets

(51) Int. Cl.

| | | |
|---|---|---|
| *G06F 3/16* | (2006.01) | |
| *H02J 7/00* | (2006.01) | |
| *G06F 1/16* | (2006.01) | |
| *G06F 21/83* | (2013.01) | |
| *G02B 27/01* | (2006.01) | |
| *G02C 11/00* | (2006.01) | |

(52) U.S. Cl.
CPC ............... *G06F 3/16* (2013.01); *G06F 21/83* (2013.01); *H02J 7/007* (2013.01); *H04N 5/2252* (2013.01); *H04N 5/2253* (2013.01); *H04N 5/23241* (2013.01); *G02B 2027/0138* (2013.01); *G02C 11/10* (2013.01)

(58) Field of Classification Search
CPC .......... G06F 3/16; H02J 7/007; H04N 5/2252; H04N 5/2253; H04N 5/23241
See application file for complete search history.

(56) References Cited

U.S. PATENT DOCUMENTS

| | | | |
|---|---|---|---|
| 8,223,024 | B1 | 7/2012 | Petrou |
| 9,742,997 | B1 | 8/2017 | Bamberger et al. |
| 10,616,470 | B2 | 4/2020 | Rodriguez, II et al. |
| 2004/0033058 | A1 | 2/2004 | Reich |
| 2004/0046869 | A1 | 3/2004 | Dibella et al. |
| 2009/0122149 | A1 | 5/2009 | Ishii |
| 2010/0201819 | A1 | 8/2010 | Minowa |
| 2012/0057843 | A1 | 3/2012 | Otani et al. |
| 2013/0135196 | A1 | 5/2013 | Park et al. |
| 2014/0114534 | A1 | 4/2014 | Zhang et al. |
| 2014/0123214 | A1* | 5/2014 | Black .................. H04L 63/083 726/1 |
| 2014/0267631 | A1 | 9/2014 | Powers et al. |
| 2014/0337621 | A1* | 11/2014 | Nakhimov .......... H04W 12/068 713/168 |
| 2015/0278499 | A1 | 10/2015 | Levitov |
| 2016/0174408 | A1 | 6/2016 | Tolbert et al. |
| 2016/0190835 | A1* | 6/2016 | Kageyama ............ H02J 7/0029 320/136 |
| 2016/0227193 | A1 | 8/2016 | Osterwood et al. |
| 2016/0370588 | A1 | 12/2016 | Parker et al. |
| 2017/0006195 | A1 | 1/2017 | Tisch et al. |
| 2017/0276941 | A1* | 9/2017 | Fujihara ................ G06F 3/0605 |
| 2017/0289443 | A1 | 10/2017 | Nguyen et al. |
| 2018/0063434 | A1 | 3/2018 | Seol et al. |
| 2019/0068873 | A1 | 2/2019 | Rodriguez, II et al. |
| 2019/0180514 | A1* | 6/2019 | Sasaki .................. H04N 13/128 |

FOREIGN PATENT DOCUMENTS

| | | |
|---|---|---|
| KR | 20130059768 A | 6/2013 |
| KR | 20170083132 A | 7/2017 |
| WO | WO-2009123079 A1 | 10/2009 |
| WO | WO-2016032453 A1 | 3/2016 |
| WO | WO-2019046794 A1 | 3/2019 |

OTHER PUBLICATIONS

"U.S. Appl. No. 15/692,968, Notice of Allowance dated Nov. 25, 2019", 10 pgs.
"U.S. Appl. No. 15/692,968, Response filed Apr. 22, 2019 to Restriction Requirement dated Feb. 13, 2019", 8 pgs.
"U.S. Appl. No. 15/692,968, Response filed Nov. 12, 2019 to Non Final Office Action dated Jul. 18, 2019", 11 pgs.
"U.S. Appl. No. 15/692,968, Restriction Requirement dated Feb. 13, 2019", 6 pgs.
"European Application Serial No. 18778690.0, Response filed Oct. 14, 2020 to Response to Communication pursuant to Rules 161(1) and 162 EPC dated Apr. 7, 2020", 23 pgs.
"International Application Serial No. PCT/US2018/049224, International Preliminary Report on Patentability dated Mar. 12, 2020", 9 pgs.
"International Application Serial No. PCT/US2018/049224, International Search Report dated Dec. 4, 2018", 4 pgs.
"International Application Serial No. PCT/US2018/049224, Written Opinion dated Dec. 4, 2018", 7 pgs.
"Korean Application Serial No. 10-2020-7009211, Notice of Preliminary Rejection dated Sep. 8, 2021", w/ English translation, 24 pgs.
"European Application Serial No. 18778690.0, Communication Pursuant to Article 94(3) EPC dated Oct. 8, 2021", 8 pgs.
"European Application Serial No. 18778690.0, Response Filed Feb. 18, 2022 to Communication Pursuant to Article 94(3) EPC dated Oct. 8, 2021", 18 pgs.
"Google Glass Buttons Explained | Google Glass Features | Glass Apps Source Glass Apps Source", XP55847035, <https://www.glassappsource.com/google-glass-features/google-glass-buttons.html>, (Jan. 2, 2014).
"Korean Application Serial No. 10-2020-7009211, Response filed Jan. 10, 2022 to Notice of Preliminary Rejection dated Sep. 8, 2021", w/English claims, 20 pgs.

* cited by examiner

WEARABLE ELECTRONIC DEVICE WITH HARDWARE SECURED CAMERA

CLAIM OF PRIORITY

This application is a continuation of U.S. patent application Ser. No. 15/692,968, filed on Aug. 31, 2017, which is incorporated herein by reference in its entirety.

TECHNICAL FIELD

The subject matter disclosed herein generally relates to image capture devices. More particularly, but not by way of limitation, the present disclosure addresses hardware-based access controls for image capture devices.

BACKGROUND

Many devices, including wearable devices, utilize electronics to perform various functions. The advent of image and audio capture devices on portable electronics, such as wearable devices, creates privacy and security concerns for users of such devices. The rise of hacking and surreptitious access and control of portable electronics presents a risk of users being recorded by third parties taking control of the user's portable device. Further, devices such as cameras attached to public-facing wearable devices create privacy concerns for members of the public with whom the user interacts. Such members of the public may want notice when being recorded and may want assurances that the user's wearable device is not surreptitiously recording under the control of a third party.

BRIEF DESCRIPTION OF THE DRAWINGS

The present disclosure is illustrated by way of example, and not by way of limitation, in the figures of the accompanying drawings.

DETAILED DESCRIPTION

The description that follows includes apparatuses, systems, and techniques that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known structures and techniques are not necessarily shown in detail. Certain embodiments described in detail herein may be referred to as examples.

Figure 1:
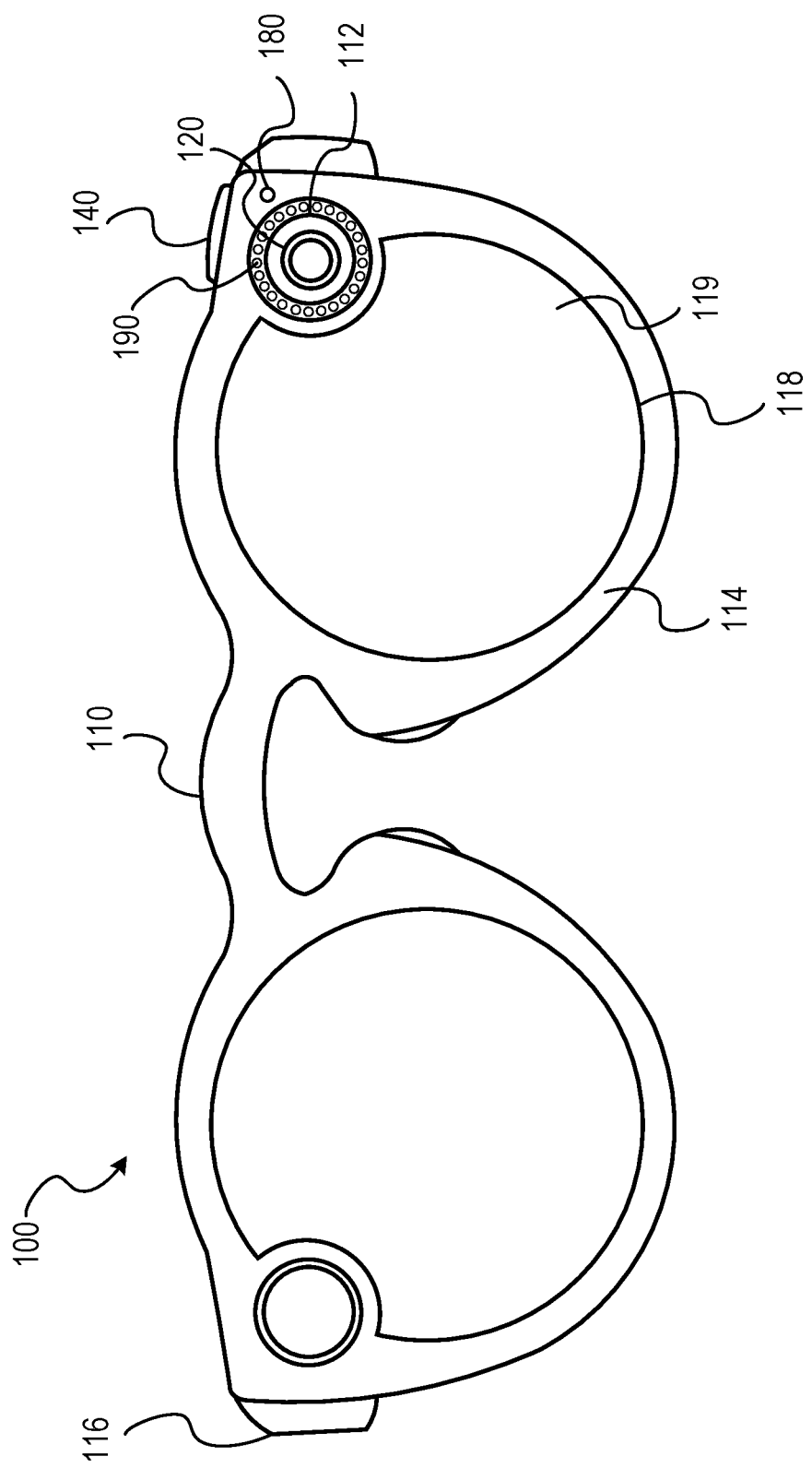
FIG. 1 is a front plan view of a securable image capture device, according to some example embodiments of the present disclosure.
Figure 2:
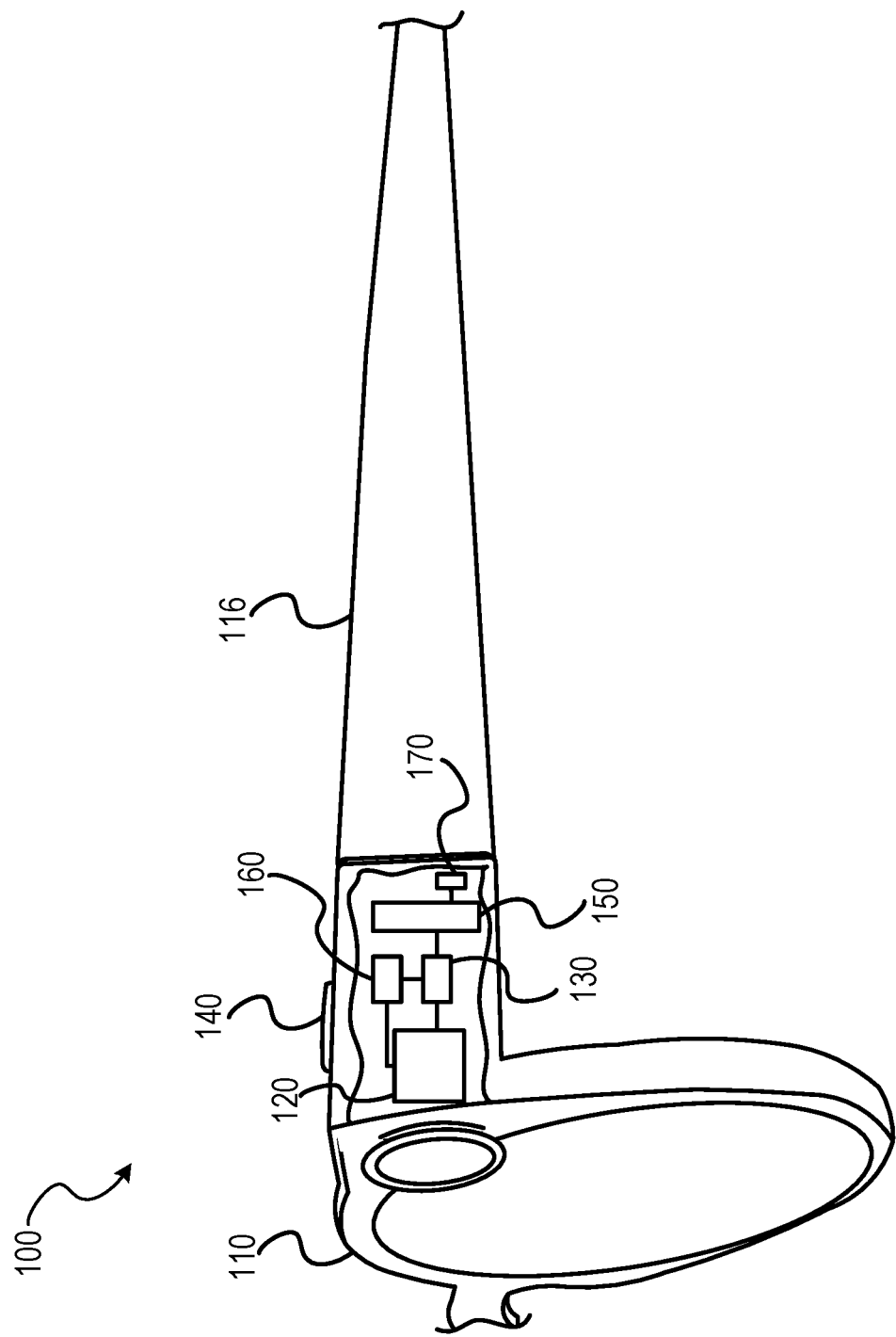
FIG. 2 is a perspective cut-away view of a securable image capture device, according to some example embodiments of the present disclosure.
Figure 3:
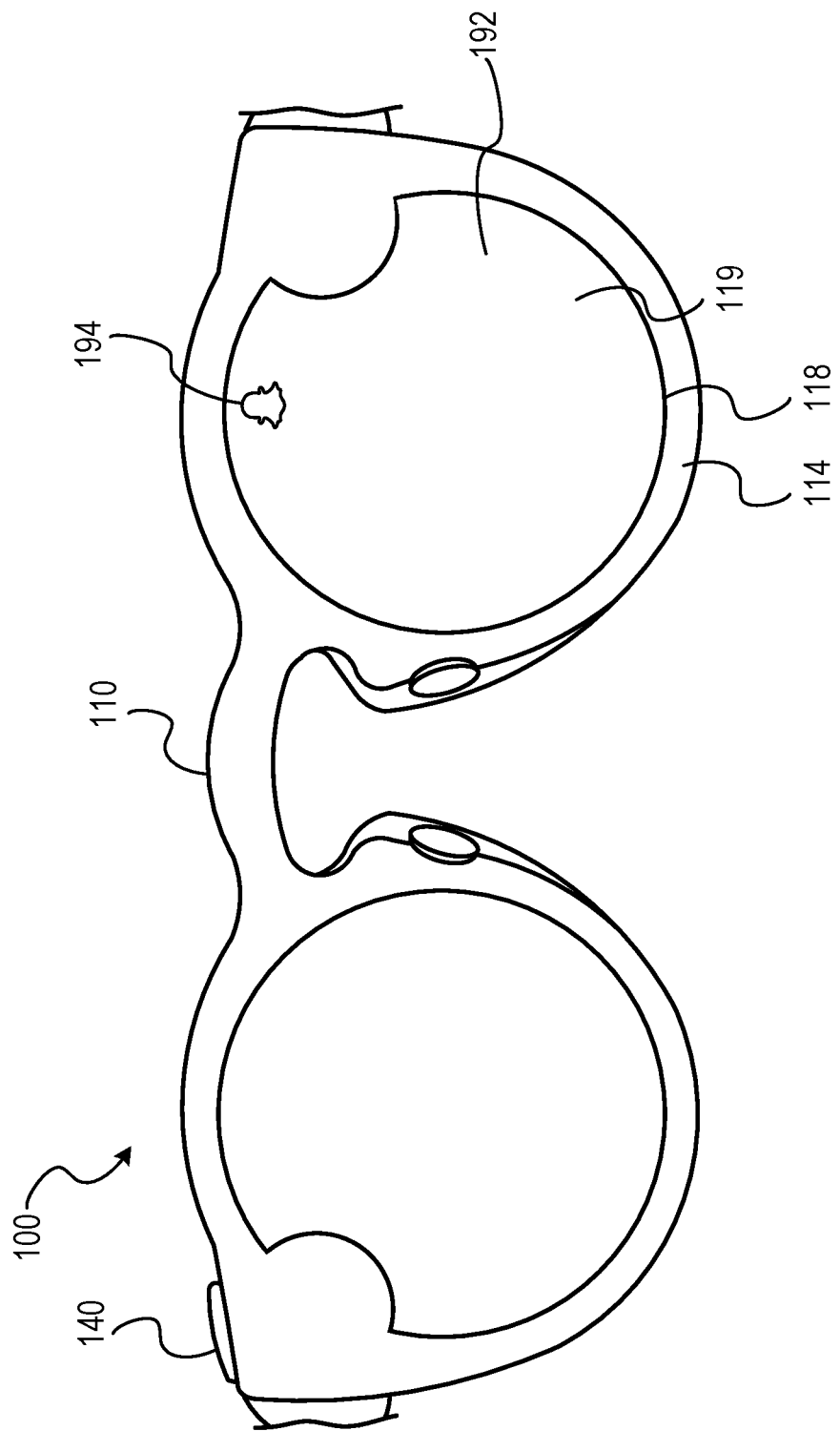
FIG. 3 is a rear plan view of a securable image capture device, according to some example embodiments of the present disclosure.

Embodiments described herein relate to apparatuses, systems, and techniques that allow hardware-based access control of portable electronic devices. One aspect of this disclosure relates to a wearable device such as an eyewear article with onboard electronic components such as a camera, a processor, WiFi components, and various other components, as is shown in FIGS. 1-3. As such, the eyewear article comprises smart glasses. The onboard electronic components can be carried by a body of the smart glasses, such as in the frame as illustrated in FIGS. 1-3, or in the temple(s). The onboard electronic components can capture image data and audio data, transmit the image and audio data, and secure data collection components from inadvertent data capture.

Incorporation of image and audio capture devices into portable electronic devices, including smart phones, smart watches, and smart glasses, may present privacy concerns for individuals positioned around a user and for the user of the device. Observers and bystanders may wish to know that they are being recorded or recorded by a user of a recording device, via image capture or audio capture. A user may wish to know that their device is secure from intrusion, hacking, or other activities in which a third party may surreptitiously surveil the user. Although software patches and security features may be used, such methods may be overcome, avoided, or removed. As such, a need exists to physically secure recording devices to prevent unwanted surveillance, recording, or other intrusive activities. Embodiments of the present inventive concepts address the technical problems of device security by implementing physical structures and interrelated components which selectively secure image capture and sound capture devices, whether the devices be wearable computing devices or other portable electronics. Some embodiments of the present disclosure provide light-emitting diode (LEI)) animation or indicators to warn observers and bystanders that a user's wearable image capture device is in use. Some example embodiments of the present disclosure provide augmented reality (AR) displays for a user of the wearable image capture device to notify the user of times when the image capture device is available or actively recording. Further, aspects of the present disclosure address factory testing and quality assurance measures to ensure that manufacturing of smart devices meets the desired security standards.

FIG. 1 shows a front plan view of a securable image capture device 100, according to some example embodiments of the present disclosure. FIG. 2 shows a perspective view with a partial cut away to show components coupled to or within the image capture device 100. As shown in FIGS. 1 and 2, the image capture device 100 may comprise a housing 110, an image capture component 120, a locking component 130, and a control component 140. The components of the image capture device 100 may be coupled to one another to form a portable electronic device. The portable electronic device may be a digital camera, a smart phone, a wearable electronic device (e.g., a smart watch or smart glasses), or any other suitable portable electronic device.

In some embodiments, the housing 110 defines an imaging aperture 112. The imaging aperture 112, defined within the housing 110, may form an opening or void extending through the housing 110. The imaging aperture 112 may extend through the housing 110 to provide an opening through which the image capture component 120 may receive or capture image data representing objects outside of the housing 110. The housing 110, as shown in FIGS. 1 and 2, may be configured as an eyewear body. The housing 110 may be configured for wearing by a user and holding one or more optical and electrical elements. The one or more electrical components, such as the image capture component 120 and the locking component 130, may be located within a cavity formed within a portion of the frame. The cavity may encompass a volume surrounding the electrical elements or components enabling heat dissipation.

The image capture component 120 may be configured to capture image data of a field of view aligned with the imaging aperture 112 defined by the housing 110. The image capture component 120 may be coupled to the housing 110. In some embodiments, the image capture component 120 may be coupled to the housing 110 such that the image capture component 120 is mounted within or partially within the housing 110. The image capture component 120 may be mounted using one or more mechanical fasteners (e.g., screws, bolts, pins, clips, or soldering), one or more molded fasteners (e.g., friction fit, molded forms, or three-dimensional printed surfaces), chemical fasteners (e.g., glue), or any other suitable fastening mechanism or technique.

In some embodiments, the image capture component 120 is coupled to the housing 110 in a position which aligns the image capture component 120 with the imaging aperture 112. In such embodiments, a lens, sensor, or other data gathering portion of the image capture component 120 is aligned with the imaging aperture 112 when a portion of the image capture component 120 is positioned within the imaging aperture 112. The image capture component 120 may also be aligned with the imaging aperture 112 when a portion of the image capture component 120 extends through or outward from the imaging aperture 112. In some instances, the image capture component 120 is aligned with the imaging aperture 112 when the image capture component 120 is able to perceive, receive, or otherwise capture image data through the imaging aperture 112.

In some example embodiments, the housing 110 comprises a frame 114 and at least one elongate temple 116. The frame 114 defines one or more optical element areas 118. The optical element areas 118 are configured to receive optical elements 119 for viewing by a user in a viewing direction. The viewing direction includes at least a portion of the field of view of the image capture component 120.

The at least one elongate temple 116 may comprise a plurality of temples. For example, the at least one elongate temple 116 may comprise two elongate temples extending outwardly from the frame 114 and spaced a distance apart to accommodate a head or face of a user. In such embodiments, the two elongate temples are temples of a pair of glasses (e.g., the image capture device 100). The elongate temple 116, shown in FIGS. 1 and 2, may be movably coupled to the frame 114. In some instances, the elongate temple 116 is configured to align the frame 114 in a defined position while the frame 114 is being worn by a user. Where the elongate temple 116 aligns the frame 114 in the defined position and the viewing direction includes the field of view of the image capture component 120, the image capture component 120 may be coupled to the housing 110, with the image capture component 120 and the imaging aperture 112 aligned with the viewing direction of the optical elements 119.

In some embodiments, two elongate temples 116 are positioned on opposing ends of the frame 114, as shown in FIG. 1. The elongate temples 116 may be connected to the frame 114 by an articulated joint. The articulated joint may comprise a hinge assembly with hinge projections configured to mate with one another. The articulated joint may also or alternatively comprise one or more of a linkage assembly, a ball joint assembly, a male/female assembly, or any other suitable mechanical connection allowing movement of the elongate temples 116 relative to the frame 114. In some embodiments, the elongate temples 116 and the frame 114 are constructed of a plastic material, cellulosic plastic (e.g., cellulosic acetate), an eco-plastic material, a thermoplastic material, or the like. Similarly, the elongate temples 116 and the frame 114 may be constructed from non-plastic materials, such as metals (e.g., steel, aluminum, or other suitable metals), natural materials (e.g., wood), or any other suitable material capable of housing or coupling to the components described herein.

As shown in FIG. 2, in some embodiments the locking component 130 modifies a capture state of the image capture component 120 by manipulating a coupling between the image capture component 120 and a power source 150. Capture states may physically enable the image capture component 120 to capture and output image data (e.g., pixel data), or prevent the image capture component 120 from capturing and outputting such image data. In some embodiments, the image capture component 120 comprises one or more lenses, one or more image sensors, one or more shutters forming at least one aperture, and one or more voltage domains. The image capture component 120 may be configured to prevent image capture or output of captured image data without a sufficient number of voltage domains being powered by a removable connection to the power source. For example, where the image capture component 120 has three voltage domains, the image capture component 120 may be prevented from capturing images or outputting captured image data without all three voltage domains being powered. The image capture component 120 may similarly be configured to preclude image capture or output of captured image data when the suitable number of voltage domains are not explicitly powered by the power source. For example, the image capture component 120 may be configured to prevent image capture despite power to one or more voltage domains, where the power originates from a leakage path. Such leakage paths may cause a voltage domain to be parasitically powered from another voltage domain or a plurality of other voltage domains.

The locking component 130 is configured to modify a capture state of the image capture component 120. In some embodiments, modifying of the capture state is performed by selectively enabling image capture (e.g., capturing image data from the field of view of the image capture component 120) in response to a selection or interaction releasing the locking component 130. In some embodiments, the locking component 130 is a component or plurality of components, working in cooperation, configured to physically prevent one or more recording or capture (e.g., image capture or audio capture) operations during a specified capture state of one or more capture components of the image capture device 100.

The locking component 130 may comprise one or more passive components and active components. In some instances, the locking component 130 may comprise one or more discrete transistors, transistor packs, piezoelectric crystals, oscillators, logic gates (e.g., non-programmable or previously configured logic gates), timer components, timer chips (e.g., non-programmable or previously configured timer chips), microcontrollers, or programmable gate arrays (e.g., gate arrays programmable with a voltage corresponding to a power source external to the image capture device 100). For example, programmable gate arrays may include Silego GreenPAK arrays, available from Silego Technology in Santa Clara, Calif. In some instances, suitable Silego GreenPAK arrays may include Silego GreenPAK 3, Silego GreenPAK 4, and Silego GreenPAK 5. Although the locking component 130 is described with respect to specific programmable gate arrays, it should be understood that any suitable component may be used.

In some instances, the locking component 130 may include a pin configured as a security disable pin. Used in a developer or testing units, the security disable pin may be configured to be pulled to ground on testing units to disable physical security on the testing device.

In some embodiments, the capture state comprises a locked state and an unlocked state. When in the locked state, the image capture component 120 may be prevented from capturing data (e.g., image, audio, or other data), When in the unlocked state, the image capture component 120 is able to capture image, audio, and other suitable data. In some embodiments, the unlocked state is configured to revert after a preset period of time, such as one to twenty minutes. In the unlocked state, in some instances, the image capture component 120 is configured to record or capture video data within predefined dimensions, such as thirty-second video clips. Similarly, predefined video data capture may include options such as extended video capture, hyperlapse (e.g., an extended recording state with a lowered frame rate during video recording), video effects, or any other suitable dimensions.

As will be explained in more detail below, the image capture component 120, in the locked state, may be prevented from data capture by disabling a connection of one or more power rails extending between the image capture component 120 and a power source of the image capture device 100. For example, the image capture component 120 may be coupled to the power rail or power rails and have a voltage regulator. An enable pin of the voltage regulator may be selectively shorted to ground in the locked state. Similarly, in the locked state, an audio capture component, such as a microphone, may have a data line shorted to ground, physically preventing data capture by the audio capture component in the locked state. The shorted state may be achieved using a field-effect transistor (FET), in some embodiments. The FET may be a metal-oxide semiconductor field-effect transistor (MOWED, for example, a negative channel field-effect transistor (NFET). The NFET may comprise one or more gates which may be pulled up to unregulated power of the power source by a pull-up resistor. Upon pulling of the one or more gates, the image capture component 120 or the audio capture component may remain in the locked state regardless of software-based attacks or certain physical attempts to modify the state. Although described with respect to manipulation of a connection between a capture component and a power source, it should be understood that the locking component 130 may employ any suitable manner of physically coupling or isolating (e.g., decoupling) a capture component from other components of the image capture device 100 to manipulate (e.g., enable or disable) data capture and the capture state.

In some embodiments, when the image capture component 120 is in the unlocked state, security related FETs (e.g., NFETs) of the image capture component 120 may be turned off or otherwise disengaged, allowing voltage regulators of the image capture component 120 to be controlled by the image capture device 100 in normal operation. For example, when the image capture component 120 is in the unlocked state, software components of or cooperating with the image capture device 100 may control and cause data capture by the image capture component 120. Similarly, when an audio capture component is in the unlocked state, security FETs of the audio capture component may be disengaged. The unlocked state, and a resulting disengagement of the security FETs, physically enable the audio capture component to capture data, allowing data to flow across the data line uninhibited.

Although described above with respect to specified embodiments, the locking component 130 may modify a capture state of the image capture device 100, or the image capture component 120, by one or more of mechanical blocking (e.g., engaging a camera shutter), blocking a power source, blocking a clock or time component, blocking data transmission or storage, blocking control signals, intercepting and selectively blocking data transmission or storage, intercepting and selectively blocking control signals, manipulation of a hardware pin, manipulation of a storage chip (e.g., manipulation of a chip, reversal of which employs a power cycle), or manipulation of any other physical component or coupling extending between components. In some embodiments, the locking component 130 may modify capture states of the image capture device 100 by selectively disabling one or more of a camera (e.g., the image capture component 120), a depth sensor, a microphone, a processor-readable storage medium (e.g., memory), a wireless communications component (e.g., a wireless transceiver), a processor, combinations thereof, or any other suitable component of the image capture device 100.

Referring again to FIGS. 1 and 2, the control component 140 is configured to receive interaction by a user of the securable image capture device 100. The interaction may trigger or otherwise act as the selection which releases the locking component 130 and triggers modification of the capture state of the image capture component 120 by the locking component 130. In some embodiments, the control component 140 is a physically accessible component selectable or otherwise manipulable by the user. For example, the control component 140 may be a button, a switch, a lever, a sensor, or any other suitable physical access component. Such physical access components ensure physical access to or interaction with the control component 140 in order to trigger the locking component 130.

As shown in FIGS. 1 and 2, in some embodiments, the securable image capture device 100 additionally comprises a power source 150, a timing component 160, a charging interface 170, an audio capture component 180, and a capture state display 190, which may be coupled to the housing 110 or one or more other components of the securable image capture device 100.

In some embodiments, the power source 150 is coupled to the locking component 130 and selectively coupled to the image capture component 120. As described above, in such embodiments, interaction with the control component 140 triggers the locking component 130 to modify the capture state of the image capture component 120 by selectively coupling the power source 150 to the image capture component 120. As described above and discussed in more detail below, the locked state may correspond to an isolation of the image capture component 120 from the power source 150, precluding operation and image capture by the image capture component 120. The unlocked state may correspond to a coupled state between the image capture component 120 and the power source 150 which enables power to flow to the image capture component 120 and for the image capture component 120 to capture image data in response to user interactions or commands.

The timing component 160 may be configured to trigger the locking component 130 in response to the locking component 130 modifying the capture state of the image capture component 120 from the locked state to the unlocked state. The timing component 160 may trigger the locking component 130 to modify or revert the capture state of the image capture component 120 from the unlocked state to the locked state. In some embodiments, the timing component 160 triggers the locking component 130 to isolate the image capture component 120 from the power source 150 after exhaustion of a predetermined period of time. For example, the period of time may be between thirty seconds and twenty minutes. In some embodiments, the period of time is eleven minutes. Although described with a specified range or specified amounts of time, it should be understood that the period of time may be any suitable time or time segment, from seconds to hours as appropriate.

The predetermined period of time may start or be initiated in response to user interaction with the control component 140 which triggers the locking component 130 to place the image capture component 120 in the unlocked state. In some instances, the predetermined period of time may start upon the locking component 130 modifying the capture state. Similarly to the manner described above, in some embodiments, the timing component 160 is configured to trigger the locking component 130 to revert a record state (e.g., from an unlocked state to a locked state) of the audio capture component 180 to prevent capture of audio data after exhaustion of the predetermined period of time. The predetermined period of time may be initiated in response to user interaction with the control component 140. In some embodiments, a predetermined period of time for the image capture component 120 may be distinct from a predetermined period of time for the audio capture component 180. For example, as discussed in more detail below, the audio capture component 180 may be activated for a predetermined period of time to listen for voice or other commands to activate the image capture component 120 during the time that the audio capture component 180 is active.

The charging interface 170 may be coupled to the power source 150. In some embodiments, the charging interface 170 is configured to detect one or more charge aspects and to trigger modification of the capture state by the locking component 130 upon detecting a charging aspect of the one or more charging aspects. The charging interface 170 may comprise a port configured to receive a plug or other power adapter and a filter capacitor configured to prevent generation of transient charges. For example, the filter capacitor may prevent overshoot caused by inductance in a printed circuit board trace. The one or more charge aspects may comprise a charging cycle, a charge cycle threshold, a voltage threshold, a time threshold, and any other suitable aspect or characteristic associated with one or more of an external power source and the power source 150. For example, the one or more charge aspects may comprise a charge cycle threshold which represents a period of time during which an external power source is connected to the charging interface 170. Upon detecting a charge cycle below the charge cycle threshold, the charging interface 170 triggers the locking component 130, causing modification of the capture state. Where the charge aspect is a voltage threshold, upon detecting a voltage exceeding the voltage threshold (e.g., a voltage at the power source 150 or a voltage entering the charging interface 170), the charging interface 170 triggers the locking component 130 to modify the capture state of the image capture component 120. Enabling a locking or unlocking of a capture state through a charging interface 170 or port may enable testing of products at a factory, a testing facility, or otherwise. Such testing may be performed on the image capture device 100 or components thereof (e.g., a camera or a microphone) with no moving parts or without user operation of the control component 140. For example, testing may be performed on an assembly line or an automated manufacturing facility without operation of the control component 140.

The audio capture component 180 may be coupled to the housing 110 and aligned with an audio aperture such that the audio capture component 180 captures audio data through the audio aperture. In some instances, the audio aperture is part of the imaging aperture 112. In some embodiments, the audio aperture is distinct from the imaging aperture 112 and spaced a distance apart from the imaging aperture 112. For example, while the imaging aperture 112 may be positioned on the frame 114, the audio aperture may be positioned on the elongate temple 116. In some embodiments, the audio capture component 180 may be configured for longer-duration unlocked capture states. For example, in response to a specified interaction with the control component 140, the audio capture component 180 may remain in a modified capture state (e.g., an unlocked state) for a duration of a voice text session, a voice call, or audio menu navigation (e.g., voice commands to select options within a displayed or spoken menu).

The capture state display 190 may be coupled to the image capture component 120. In some embodiments, the capture state display 190 receives a signal from the image capture component 120 in response to one or more of the image capture component 120 being in the unlocked state and the image capture component 120 capturing image data. In some embodiments, the capture state display 190 causes presentation of an indicator representing the unlocked state. As shown in FIG. 1, some embodiments of the capture state display 190 cause presentation of the indicator to observers of the user and the image capture device 100. For example, as shown, a series of LED indicators may be positioned about the image capture component 120. Upon modification of the capture state to an unlocked state, one or more of the LED indicators may illuminate, generate an animation, or otherwise show that the image capture device 100 is enabled for hands-free operation. In some instances, a series of LEDs arranged in a circle could be sequentially lit, such that a single LED appears to be spinning around the LED circle for the duration of the unlocked state.

As shown in FIG. 3, the capture state display 190 may cause presentation of the indicator to the user, with or without presentation of the indicator to observers other than the user. In some embodiments, the capture state display 190 may be incorporated into an augmented reality (AR) display 192 comprising the capture state display 190, the optical elements 119, and other suitable display components. The AR display 192 may generate an AR element 194 within a viewable area of the AR display 192. In some embodiments, when the image capture component 120 or the audio capture component 180 is in an unlocked state, the AR display 192 generates the AR element 194 such that the user of the image capture device 100 may observe the capture state. In this way, the user may be notified of the current capture state of the image capture component 120 or the audio capture component 180 without displaying the notification to others.

In some embodiments, the AR display 192 may be affected by the control component 140. For example, AR notifications in addition to a notification of an unlocked state may appear on the AR display 192. Notifications may be selectively pushed to the AR display 192 based on user interactions, operations of one or more of the control component 140 and the locking component 130, or operations of the image capture device 100. The locked state of the image capture component 120 or the audio capture component 180 may limit an amount of time the AR notification is present or may preclude the AR notification within the AR display 192 while presenting the AR notification as a voice or haptic notification.

Figure 4:
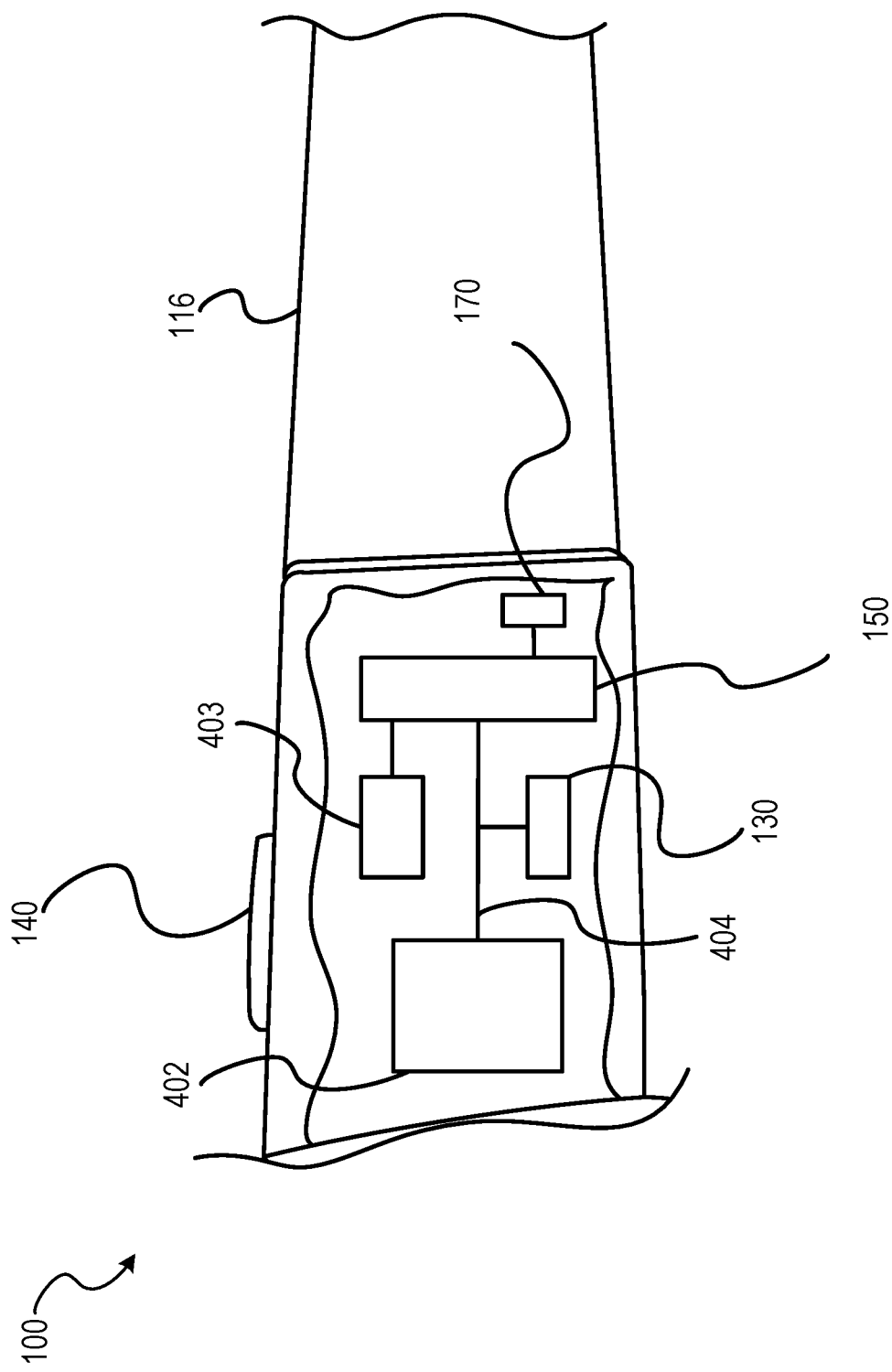
FIG. 4 is a block diagram illustrating components of a securable image capture device, according to some example embodiments of the present disclosure.

The locking component 130 is described above in example embodiments as being positioned between the image capture component 120 and the power source 150. As shown in FIG. 4, the locking component 130 may interact with or manipulate a coupling extending between one or more processors 402 and another component of the image capture device 100. In FIG. 4, the locking component 130 is positioned along or intersecting a transmission path 404 selectively coupling the processor 402 and the power source 150. Selective coupling of the processor 402 and the power source 150 may preclude data transfer, commands, or instructions from passing from the processor 402 to the power source 150. For example, isolation or separation of the transmission path 404 may preclude the power source 150 from passing energy to the processor 402 or passing energy to one or more other components 403, in response to commands from the processor 402.

The locking component 130 may operate in a manner similar to or the same as that described above with respect to FIG. 2. In some embodiments, selection of or interaction with the control component 140 may cause the locking component 130 to selectively couple the processor 402 and the power source 150 by completing the transmission path 404 or a coupling extending between the processor 402 and the power source 150. Interaction with the control component 140, exhaustion of a time period, or any other suitable feature may cause the locking component 130 to isolate the processor 402 from the power source 150 by separating or otherwise interrupting the transmission path 404.

In some embodiments, the transmission path 404 may extend between and selectively couple the processor 402 and a power source for a specified component of the image capture device 100. For example, the transmission path 404 may extend between the processor 402 and a power supply for the image capture component 120 (e.g., an imaging sensor). In some instances, the transmission path 404 may extend between the processor 402 and a power supply for one or more other components of the image capture device 100, such as a camera, a microphone (e.g., the audio capture component 180), a depth sensor, a processor-readable storage medium, a communication component (e.g., a wireless transceiver), or any other component configured to enable operation of the image capture device 100. Although described with respect to specified embodiments, it should be understood that the locking component 130 may selectively couple or isolate any two or more components to enable manipulation of the capture state of the image capture device 100.

Figure 5:
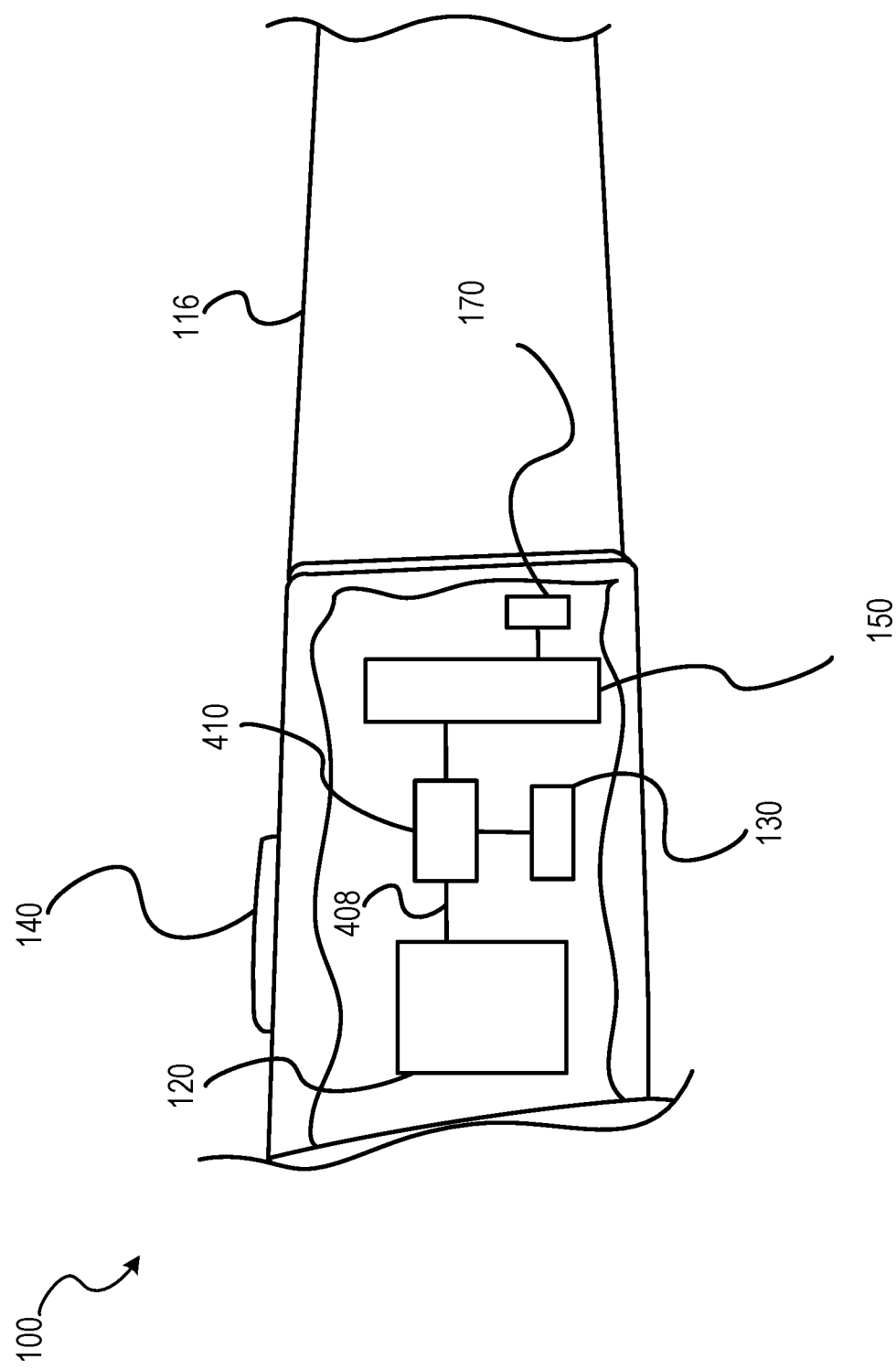
FIG. 5 is a block diagram illustrating components of a securable image capture device, according to some example embodiments of the present disclosure.

In some embodiments, as shown in FIG. 5, the locking component 130 may connect or separate a transmission path 408 between components (e.g., the power source 150 and a sensor, a processor-readable storage medium, a wireless transceiver, the image capture component 120, etc.) with an intermediary component. In some instances, the transmission path 408 is an electrical coupling extending between two components and configured to transfer one or more of power and data from one component to another. The transmission path 408 may also be configured to be physically separated to periodically or temporarily prevent a coupling of the two components and transmission of one or more of energy, data, or other suitable elements traveling or being transmitted via the transmission path 408.

As shown, the intermediary component may be a power switch 410. The power switch 410 may be positioned along the transmission path 408 between the power source 150 and another component. Interaction with the control component 140 may cause the locking component 130 to enable the power switch 410, completing the connection or coupling of the transmission path 408 between the power source 150 and the other component (e.g., the image capture component 120). Isolation of the power source 150 from the other component may be performed by manipulation of the power switch 410 by the locking component 130, in response to interaction with the control component 140, a passage of time, exhaustion of a timer or time limit, or any other suitable defining factor.

Figure 6:
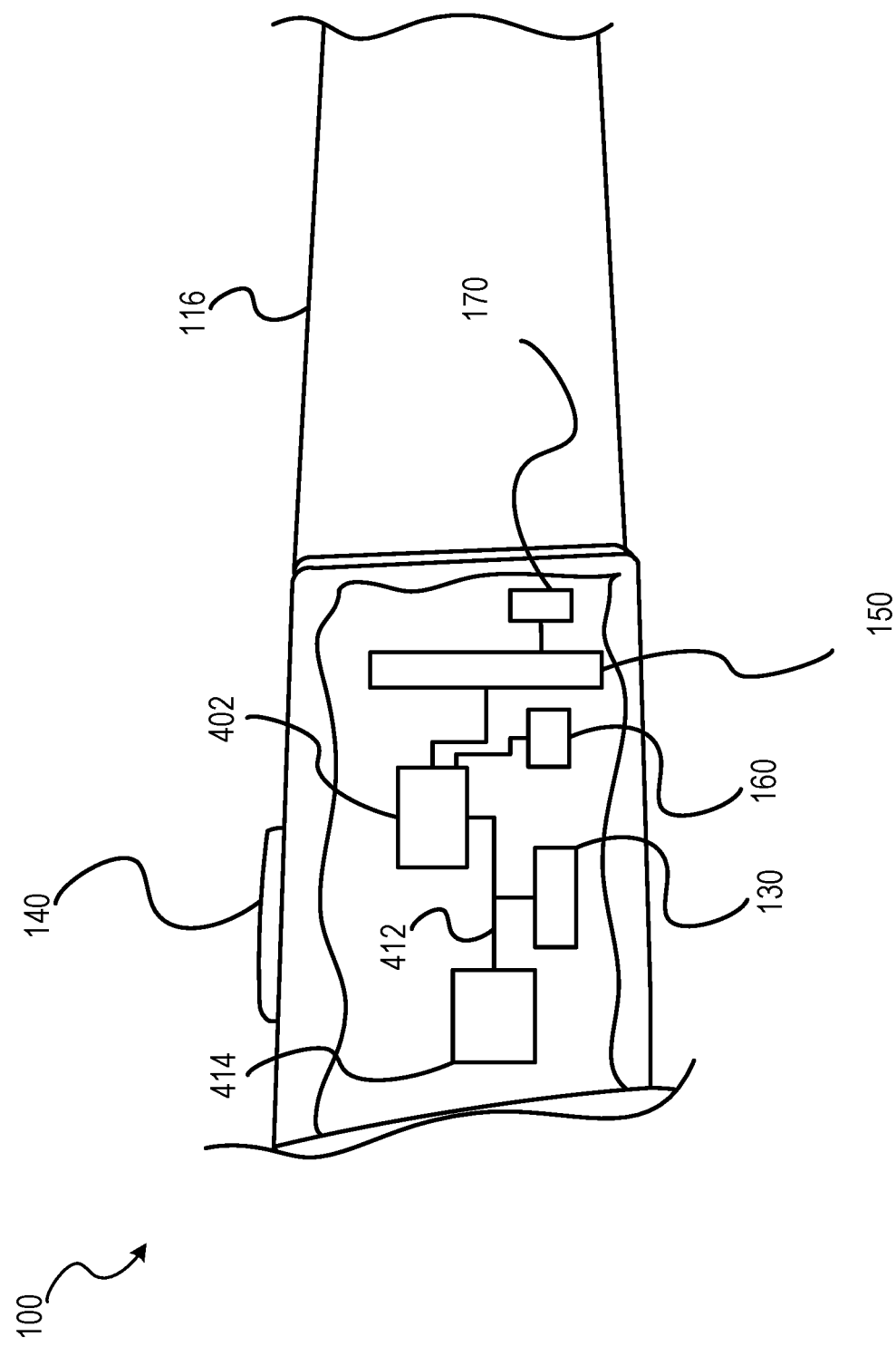
FIG. 6 is a block diagram illustrating components of a securable image capture device, according to some example embodiments of the present disclosure.

FIG. 6 depicts an embodiment of components of the image capture device 100 in which the locking component 130 manipulates a transmission path 412 between the processor 402 and a component 414 of the image capture device 100. As shown, the locking component 130 may act upon the transmission path 412 to selectively couple or isolate the processor 402 and the component 414. In some embodiments, the component 414 may be the image capture component 120, the timing component 160, a processor-readable storage medium, a communication component (e.g., a wireless transceiver), a sensor (e.g., an imaging sensor, a clock, or a location sensor), or any other suitable component.

In some embodiments, the locking component 130 manipulates the transmission path 412 to selectively block or enable signals transmitted by the processor 402 to the component 414. For example, the component 414 may be a processor-readable storage medium and the locking component 130 may selectively block or enable data transmission from the processor 402 to the processor-readable storage medium. In the example embodiment, the locking component 130 may block or enable the ability of the processor 402 to store data on the processor-readable storage medium, transmit requests or instructions to recall data from the processor-readable storage medium, or perform any other data transmission.

The data transmitted by the processor 402, which is blocked or enabled by manipulation of the transmission path 412 by the locking component 130, may be data generated by the processor 402 (e.g., augmented or edited image data) or data received from one or more other components by the processor 402 for transmission to the component 414. For example, the component 414 (e.g., a sensor, an imaging sensor, a wireless transceiver, or a processor-readable storage medium) may use time information, generated by the timing component 160 or a portion of the processor 402. In response to manipulation of the control component 140, the locking component 130 may enable transmission of time information (e.g., a clock signal) from the processor 402 to the component 414 via the transmission path 412, after the processor 402 receives the time information from the timing component 160 or generates the time or timing information within the portion of the processor 402. In such embodiments, a clock signal, a time stamp, or other time information may be transmitted to or blocked from transmission to a sensor, another processor, a processor-readable storage component, or a wireless transceiver based on manipulation of the transmission path 412 by the locking component 130.

In some embodiments, the locking component 130 manipulates the transmission path 412 to block or enable signals transmitted by the component 414 to the processor 402. For example, where the component 414 is a sensor, such as an imaging sensor, the locking component 130 may selectively couple the imaging sensor and the processor 402 by completing a path of the transmission path 412. Once coupled by the locking component 130, the component 414 (e.g., an imaging or other sensor) may transmit data to the processor 402. In these example embodiments, the transmission path 412 extends between an output port (e.g., data out) of the component 414 and an input port (e.g., data in) of the processor 402. In some embodiments, the blocked data may be generated by the component 414 transmitting the data to the processor 402. For example, an image sensor may be blocked from transmitting captured image or video data of a field of view. In some instances, the blocked data may be generated by or otherwise originate from another component, with the component 414 acting as an intermediary between the generating component and the processor 402.

In some embodiments, the locking component 130 manipulates the transmission path 412 to block signals in both directions. For example, the locking component 130 may isolate the processor 402 to prevent the processor 402 from receiving signals from or transmitting signals to the component 414. The signals may be control signals, data transfer, or any other suitable information transmitted between the processor 402 and the component 414.

Figure 7:
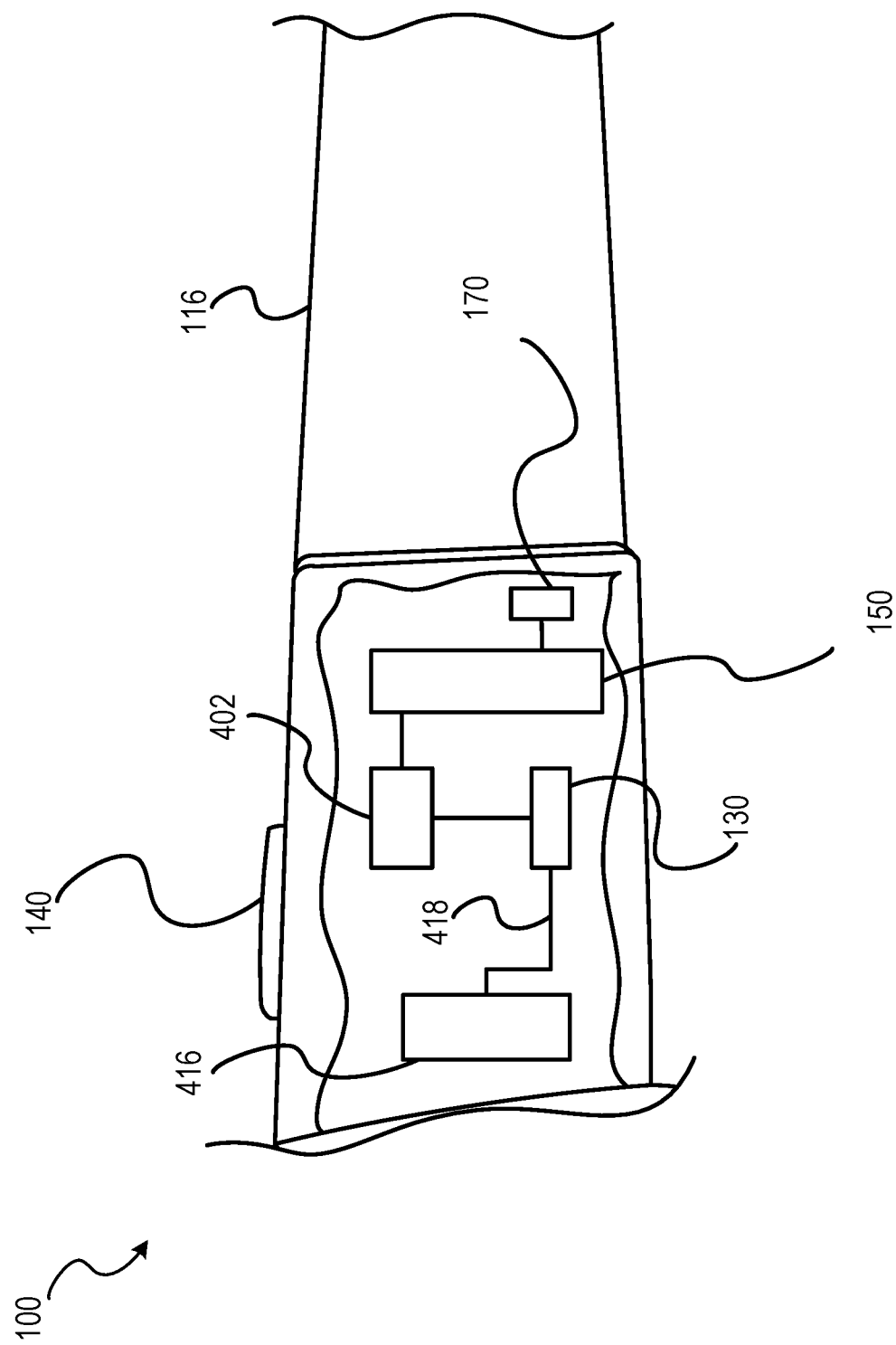
FIG. 7 is a block diagram illustrating components of a securable image capture device, according to some example embodiments of the present disclosure.

FIG. 7 depicts an embodiment of components of the image capture device 100 in which the locking component 130 acts as an intercept between the processor 402 and a component 416. In some embodiments, the processor 402 transmits control signals along a transmission path 418. The control signals are intercepted by the locking component 130 and blocked or passed along to the component 416 based on a capture state of the image capture device 100 in response to interactions with the control component 140. In some instances, while the image capture device 100 is in a locked capture state, the locking component 130 may selectively block a first set of command signals from the processor 402 while allowing or retransmitting a second set of command signals from the processor 402 to the component 416, as will be explained in more detail below.

Figure 8:
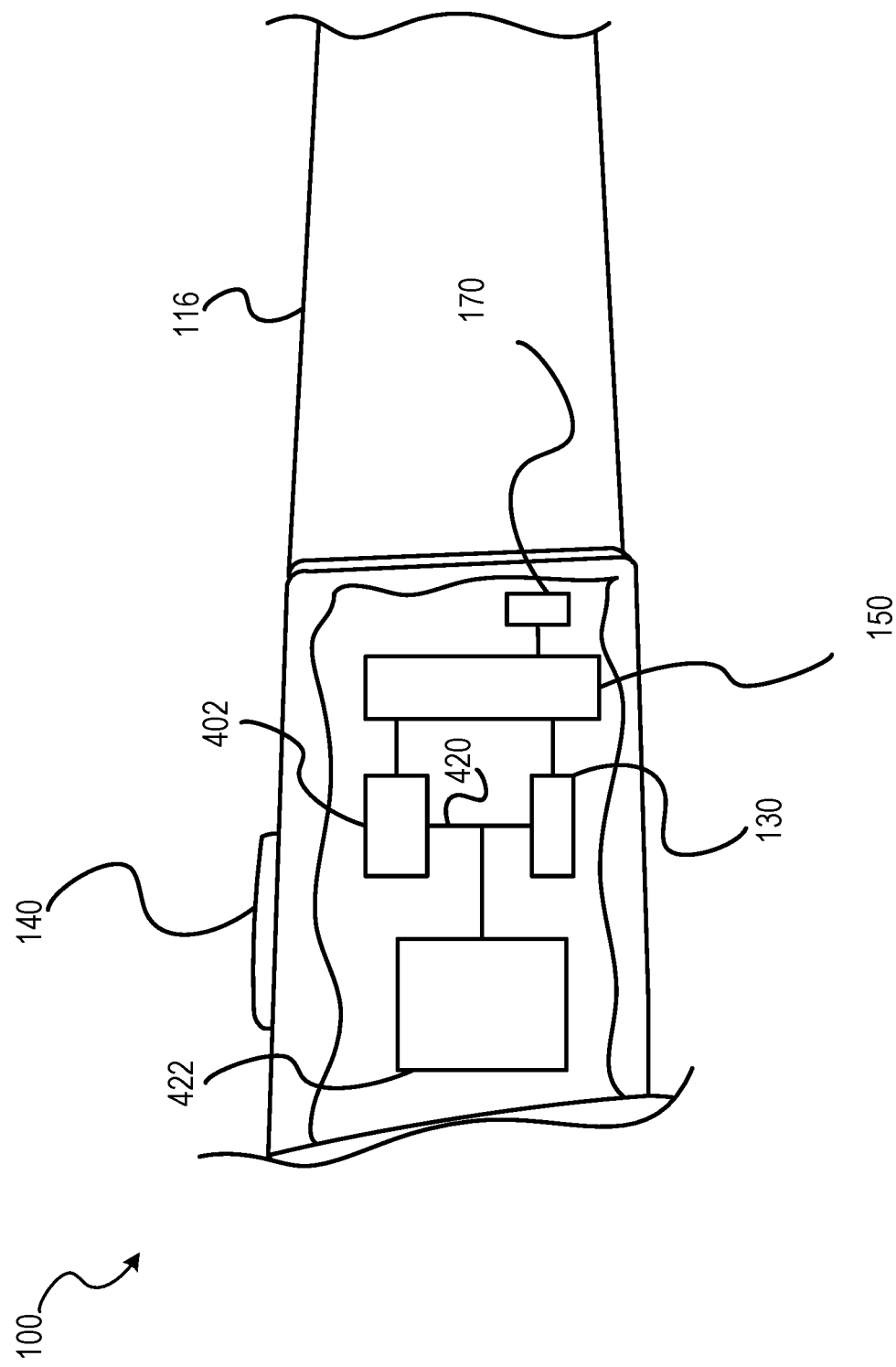
FIG. 8 is a block diagram illustrating components of a securable image capture device, according to some example embodiments of the present disclosure.

FIG. 8 depicts an embodiment of components of the image capture device 100 in which the locking component 130 acts as a dual master along a transmission path 420 between the processor 402 and a component 422. In some embodiments, the processor 402 transmits control signals along the transmission path 420 to the component 422. The locking component 130 may also transmit control signals along at least a portion of the transmission path 420 to the component 422. Combinations of the control signals from the processor 402 and the locking component 130 enable operation of the component 422 based on the capture state, as described in more detail below.

Figure 9:
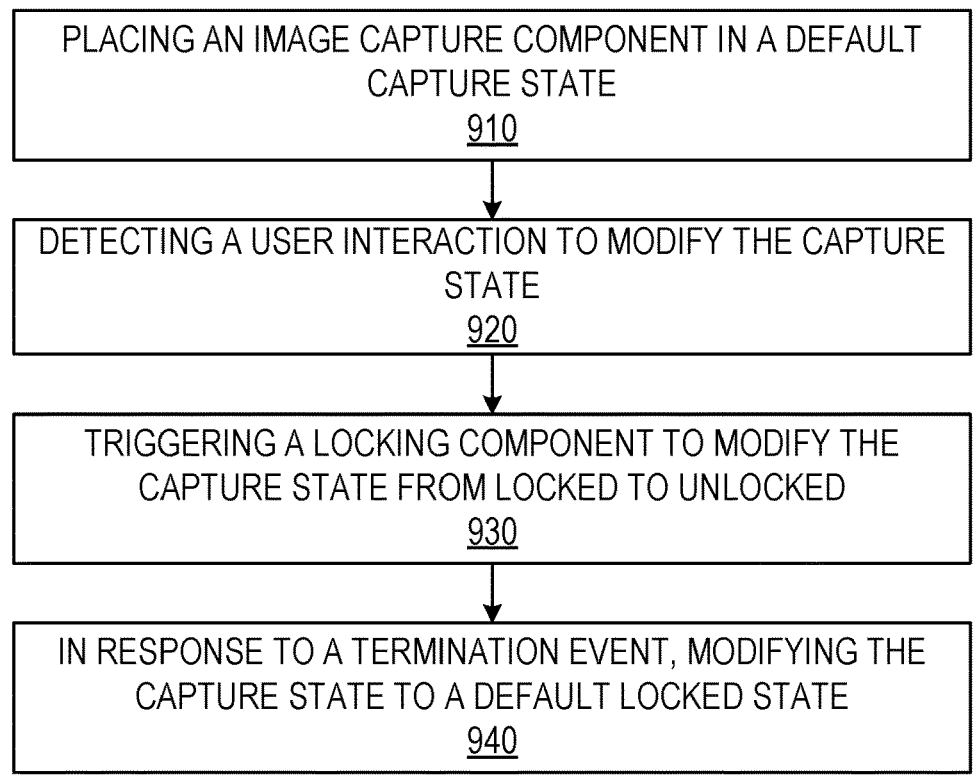
FIG. 9 is a flow diagram illustrating an example method for selectively securing an image capture device, according to some example embodiments.

FIG. 9 depicts a flow diagram illustrating an example method 900 for selectively securing an image capture device, according to some example embodiments. The operations of the method 900 may be performed by components of the image capture device 100, and are so described below for purposes of illustration.

In operation 910, the locking component 130 places the image capture component 120 in a default capture state. The default capture state may be a locked state. In the default locked or secured state, the image capture component 120 may be physically prevented from capturing image data or transferring captured image data. In some embodiments, the locking component 130 places the image capture component 120 in the default capture state by selectively disabling or isolating a connection between the image capture component 120 and the power source 150.

In some embodiments, the locking component 130 places the image capture component 120 in the locked capture state, isolating a coupling to the power source 150, by pulling a pull-up resistor coupled to a gate of an NFET. The pull-up resistor may prevent unregulated power from the power source 150 from reaching the image capture component 120. The locking component 130 may retain the locked state of the image capture component 120 until the locking component 130 is suitably triggered by the control component 140. Operation 910 may be automatically performed, such that the locked state is a default state of the image capture device 100.

In operation 920, the control component 140 detects a user interaction. In embodiments where the control component 140 comprises a physical button, the user interaction may include a user depressing or otherwise triggering the button. In some embodiments, the button of the control component 140 resets after receiving the user interaction. For example, the button may be initially located at a first position. Depressing the button places the button at a second position, such as flush with the frame 114 or the elongate temple 116. After the button is released, the button may immediately return to the first position. In some embodiments, the button may reset upon the capture state reverting back to the locked state.

In operation 930, in response to the control component 140 receiving the user interaction, the control component 140 triggers the locking component 130. In some embodiments, the control component 140 triggers the locking component 130 by releasing or otherwise causing a voltage to pass to the locking component 130. The voltage may be above a predefined voltage threshold, such that upon exceeding the voltage threshold, the voltage triggers the locking component 130. In some embodiments, the control component 140 triggers the locking component 130 to modify the capture state from the locked state to an unlocked state. Where the locking component 130 comprises or includes a pull-up resistor, the locking component 130 may modify the capture state by positioning the pull-up resistor to complete the circuit or coupling between the image capture component 120 and the power source 150.

Although described with respect to the image capture component 120, in some embodiments, the locking component 130 also modifies the capture state of the audio capture component 180. The modification of capture states of the image capture component 120 and the audio capture component 180 may be linked, such that unlocking the image capture component 120 also unlocks the audio capture component 180. In some embodiments, modification of a capture state of the image capture component 120 is separated from modification of the capture state of the audio capture component 180.

In operation 940, in response to a termination event, the locking component 130 subsequently modifies the capture state of the image capture component 120. The termination event may be an elapsed time period, a dormant period, data capture (e.g., capture of audio data, image data, or video data), or any other suitable termination event. The subsequent modification may transition or modify the capture state from the unlocked state back to the default locked state. In some embodiments, the locking component 130 reverts the capture state from the unlocked state to the locked state by pulling the pull-up resistor. Upon the locking component 130 manipulating the pull-up resistor, the coupling between the image capture component 120 and the power source 150 may again be shorted to ground through the NFET.

Figure 10:
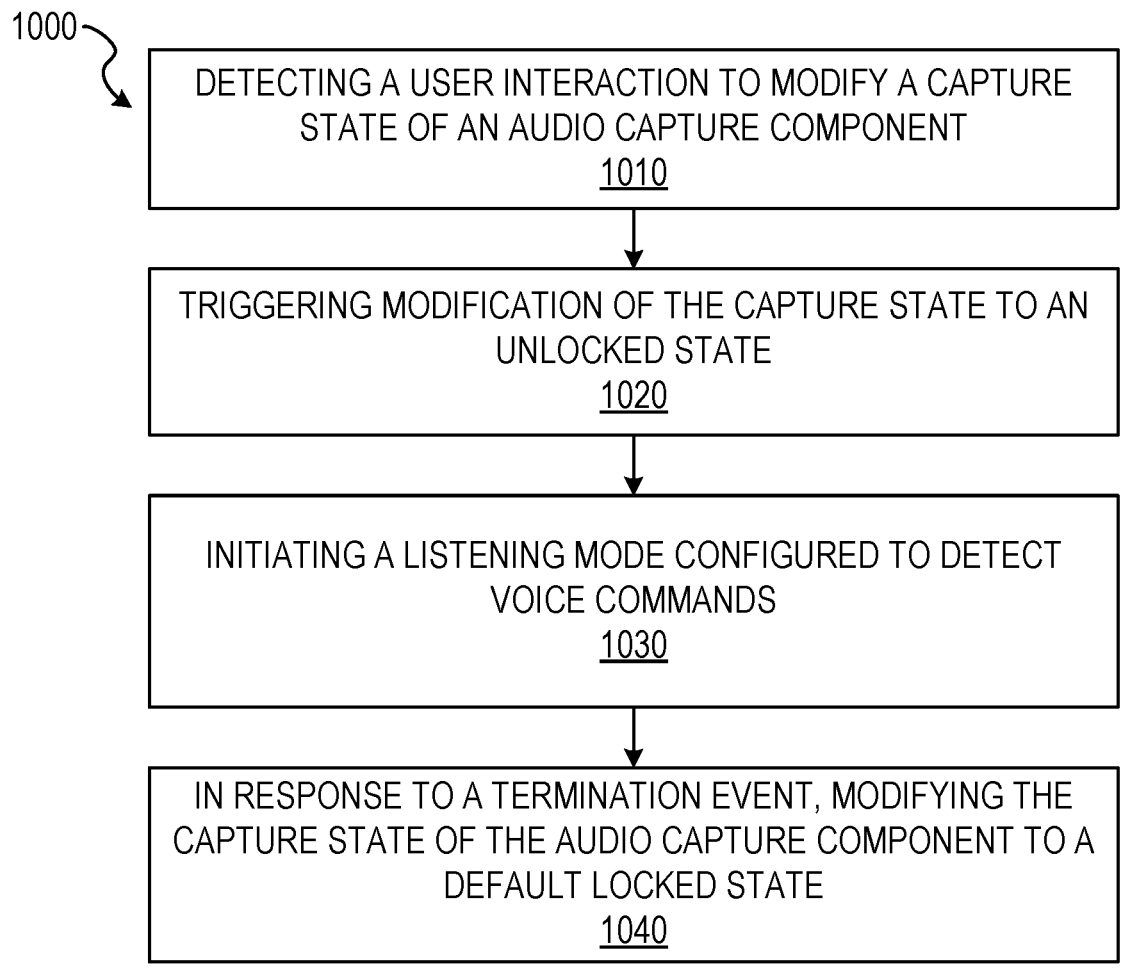
FIG. 10 is a flow diagram illustrating an example method for selectively securing an image capture device, according to some example embodiments.

FIG. 10 depicts a flow diagram illustrating an example method 1000 for selectively securing an image capture device, according to some example embodiments. The operations of the method 1000 may be performed by components of the image capture device 100. In some instances, certain operations of the method 1000 may be performed using one or more operations of the method 900 or as sub-operations of one or more operations of the method 900, as will be explained in more detail below.

In operation 1010, the control component 140 detects a user interaction. The user interaction may include depressing a physical button included as part of the control component 140, moving a switch, or otherwise interacting with a portion of the control component 140. The operation 1010 may be performed similarly to or the same as described above with respect to operation 920.

In operation 1020, in response to the control component 140 receiving the user interaction, the control component 140 triggers the locking component 130. In some embodiments, the control component 140 triggers the locking component 130 by releasing or causing a voltage to pass to the locking component 130. Once triggered, the locking component 130 modifies a capture state of the audio capture component 180, The locking component 130 may modify the capture state from a default locked state to an unlocked state (e.g., a record state or a listen state), in a manner similar to that described above.

In operation 1030, based on the modification of the capture state, the audio capture component 180 initiates a listening mode. In the listening mode, the audio capture component 180 detects audio data perceivable to the audio capture component 180 and monitors the audio data for one or more commands or cues. In some embodiments, the one or more commands are voice commands or prompts. For example, a user's voice command of "start" or "take a video" may be captured by the audio capture component 180. The audio capture component 180 may pass an indicator to the image capture component 120. Upon the audio capture component 180 passing the indicator to the image capture component 120, the locking component 130 may modify the capture state of the image capture component 120, enabling capture of image and video data. In response to receiving the indicator, the image capture component 120 may initiate image or video capture of a scene within the field of view of the image capture component 120. Although described with respect to unlocking the image capture component 120 in response to receiving the voice command, it should be understood that the unlocking operation may be performed in or along with operation 1020. In such instances, receipt of the indicator from the audio capture component 180 triggers image data capture based on the previously unlocked capture state.

In operation 1040, in response to a termination event, the locking component 130 subsequently modifies the capture state of the audio capture component 180 from the unlocked state to the default locked state. The locking component 130 may also modify the capture state of the image capture component 120 in response to the termination event. In some embodiments, the operation 1040 may be performed in a manner similar to or the same as operation 940, described above.

Figure 11:
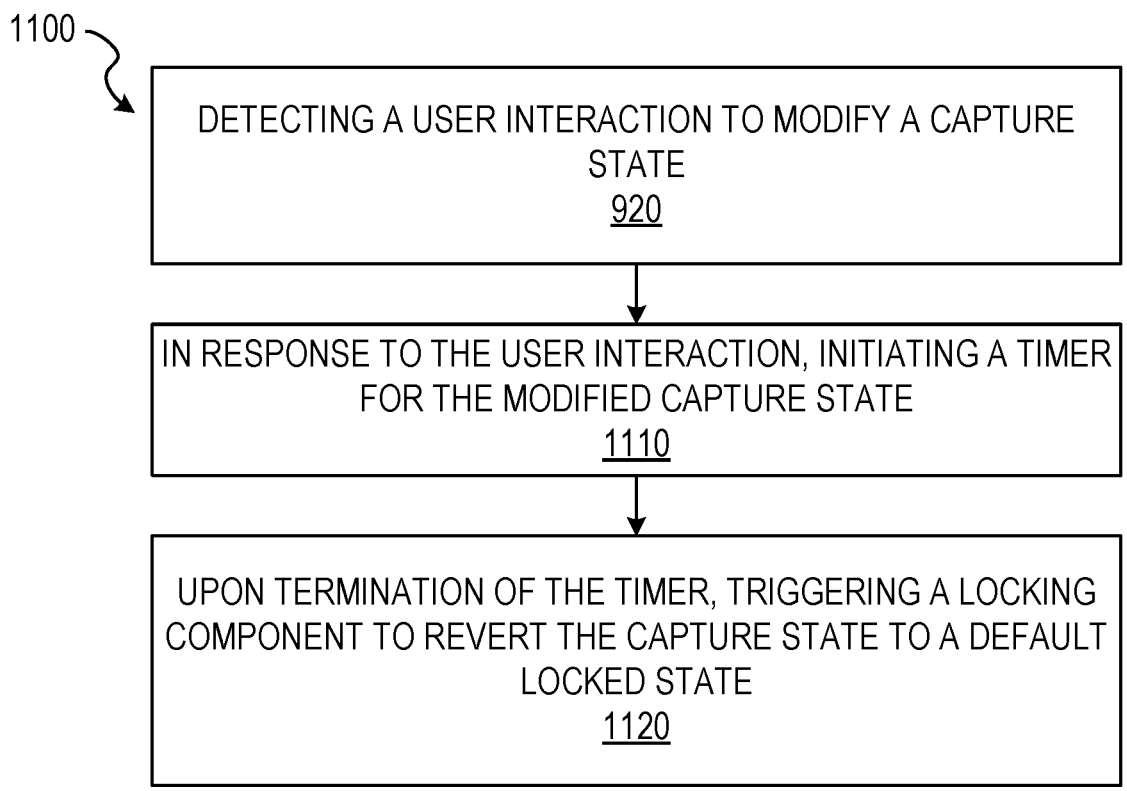
FIG. 11 is a flow diagram illustrating an example method for selectively securing an image capture device, according to some example embodiments.

FIG. 11 depicts a flow diagram illustrating an example method 1100 for selectively securing an image capture device, according to some example embodiments. The operations of the method 1100 may be performed by components of the image capture device 100. In some instances, certain operations of the method 1100 may be performed using one or more operations of the methods 900 or 1000, or as sub-operations of one or more operations of the methods 900 or 1000, as will be explained in more detail below. For example, the method 1100 may be initiated using one or more of operations 920 or 1010, described above.

In operation 1110, in response to the control component 140 receiving the user interaction, the timing component 160 initiates a timer (e.g., a countdown of a predetermined time period). The predetermined time period may be any suitable time period, such as ten or eleven minutes. In some embodiments, upon receiving or detecting the user interaction, the control component 140 passes an indication of the user interaction to the timing component 160. In some embodiments, the indicator is a portion of data instructing the timing component 160 to initiate the timer. The indicator may also be a voltage passed from the control component 140 to the timing component 160.

In operation 1120, upon termination of the predetermined time period (e.g., a timer), the timing component 160 triggers the locking component 130 to revert the capture state of one or more of the image capture component 120 and the audio capture component 180 from the unlocked state to the locked state. In some embodiments, triggering of the locking component 130 is subject to active usage of the image capture component 120 or the audio capture component 180. For example, where the predetermined time period elapses while the image capture component 120 is capturing video data, the locking component 130 may trigger modification of the capture state after cessation of the video capture. In some instances, postponing of the reversion of the capture state may be performed based on a recording limitation of the image capture component 120. For example, where the image capture component 120 is limited to video capture in predetermined time segments, the locking component 130 may postpone locking of the image capture component 120 while the image capture component 120 is actively recording, until the video capture is complete or the predetermined time segment has elapsed.

Figure 12:
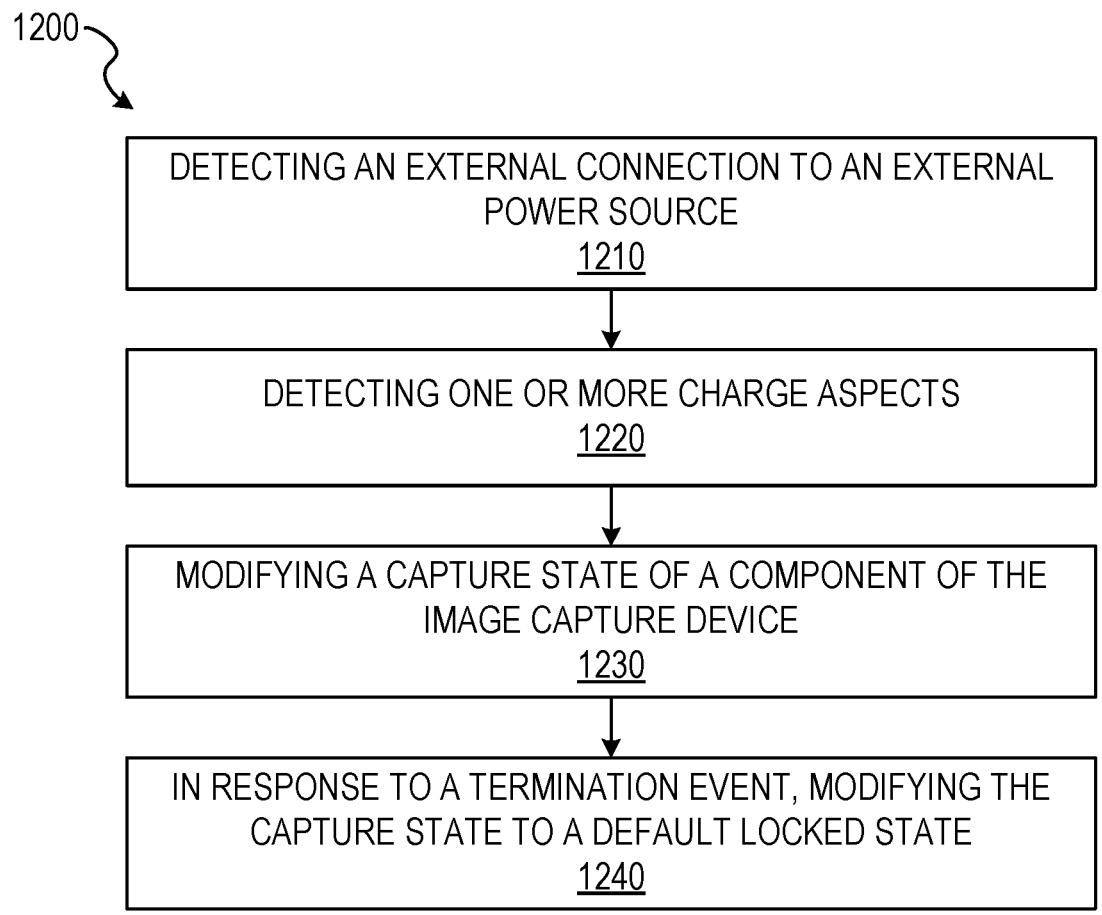
FIG. 12 is a flow diagram illustrating an example method for testing selective securing of an image capture device, according to some example embodiments.

FIG. 12 depicts a flow diagram illustrating an example method 1200 for testing selective securing of an image capture device, according to some example embodiments. The operations of the method 1200 may be performed by components of the image capture device 100.

In operation 1210, the charging interface 170 detects an external connection to the image capture device 100. In some embodiments, the external connection is an external power source distinct from the power source 150 of the image capture device 100. The external connection may also be a connection to a charging case, an electrically coupled case, a testing device, or any other suitable connection of the charging interface 170 to a device or component external to the image capture device 100. The charging interface 170 may detect an external connection based on power being supplied to the charging interface 170 or one or more circuits or components coupled to the charging interface 170.

In operation 1220, one or more of the charging interface 170 and the locking component 130 detect one or more charge aspects at the charging interface 170. The one or more charge aspects may include a charge cycle, a charge cycle threshold, a voltage, a voltage threshold, or any other suitable aspect or characteristic associated with a power transfer into the charging interface 170. The voltage threshold may be a value above that which may normally be produced within the image capture device 100.

In some embodiments, the one or more charge aspects comprise a waveform applied to charging pins of the charging interface 170. The waveform may initiate at zero volts or a voltage below or at a digital low for a portion of the locking component 130 (e.g., the programmable gate array). After initiating at the low voltage, an edge of the voltage may rise to a level which is greater than or equal to a specified voltage or voltage threshold (e.g., four volts). Upon detecting the waveform, the charging interface 170 or the locking component 130 determines that the waveform matches a charge aspect and proceeds to operation 1230.

The one or more charge aspects may also comprise a time between receiving power or charges from an external power source. The time may be an amount of time configured to act as a factory unlock signature. For example, the time may act as a power or charge cycle shorter than expected from general use of the image capture device 100. The time associated with the charge cycle may be 0.3 seconds to five seconds, or any other suitable amount of time. Upon determining that a time between charges or a duration of a charging cycle matches a charge aspect, the charging interface 170 or the locking component 130 continues to operation 1230.

In some embodiments, a test process may be run to provide a voltage, charging cycle, or threshold which is below acceptable limits to modify the capture state of the image capture component 120. In such instances, the test process may determine whether tampering or circumvention of the locking component 130 is possible. Where the charge aspect is a waveform, the test process may supply insufficient or incorrect waveforms to determine whether one or more of the image capture component 120 or the audio capture component 180 may be forced into a modified state with an improper waveform.

In some embodiments, as part of or in lieu of modifying the capture state, a test process may be booted and run in an attempt to provide power to the image capture component 120. In such instances, the test process may determine whether elements of the locking component 130 maintain a low voltage or no voltage for the image capture component 120, despite efforts to provide a higher voltage.

In operation 1230, the locking component 130 modifies the capture state of one or more of the image capture component 120 and the audio capture component 180. In some embodiments, the locking component 130 modifies the capture state from the default locked state to an unlocked state. In some instances, the locking component 130 modifies the capture state to a testing state. The testing state may be configured to monitor or test functions of one or more components of the image capture device 100, such as in a factory setting. The operation 1230 may be performed in a manner similar to or the same as operations 930 or 1020, described above.

When the test process provides inappropriate waveforms, sub-threshold voltages, or other testing aspects, the locking component 130 or the testing component may determine whether one or more of the audio capture component 180 or the image capture component 120 become active as a result of improper input or charge aspects. Where no action is performed by the image capture component 120 or the audio capture component 180, or noise is produced (e.g., all ones, all zeros, or random data), the test processes may ensure a secure state of the data collection components.

In operation 1240, in response to a termination event, the locking component 130 modifies the capture state of the image capture component 120 or the audio capture component 180. The modification of capture states may transition the capture states from an unlocked state to the default locked state. In some embodiments, operation 1240 may be performed in a manner similar to or the same as operation 940, described above.

Figure 13:
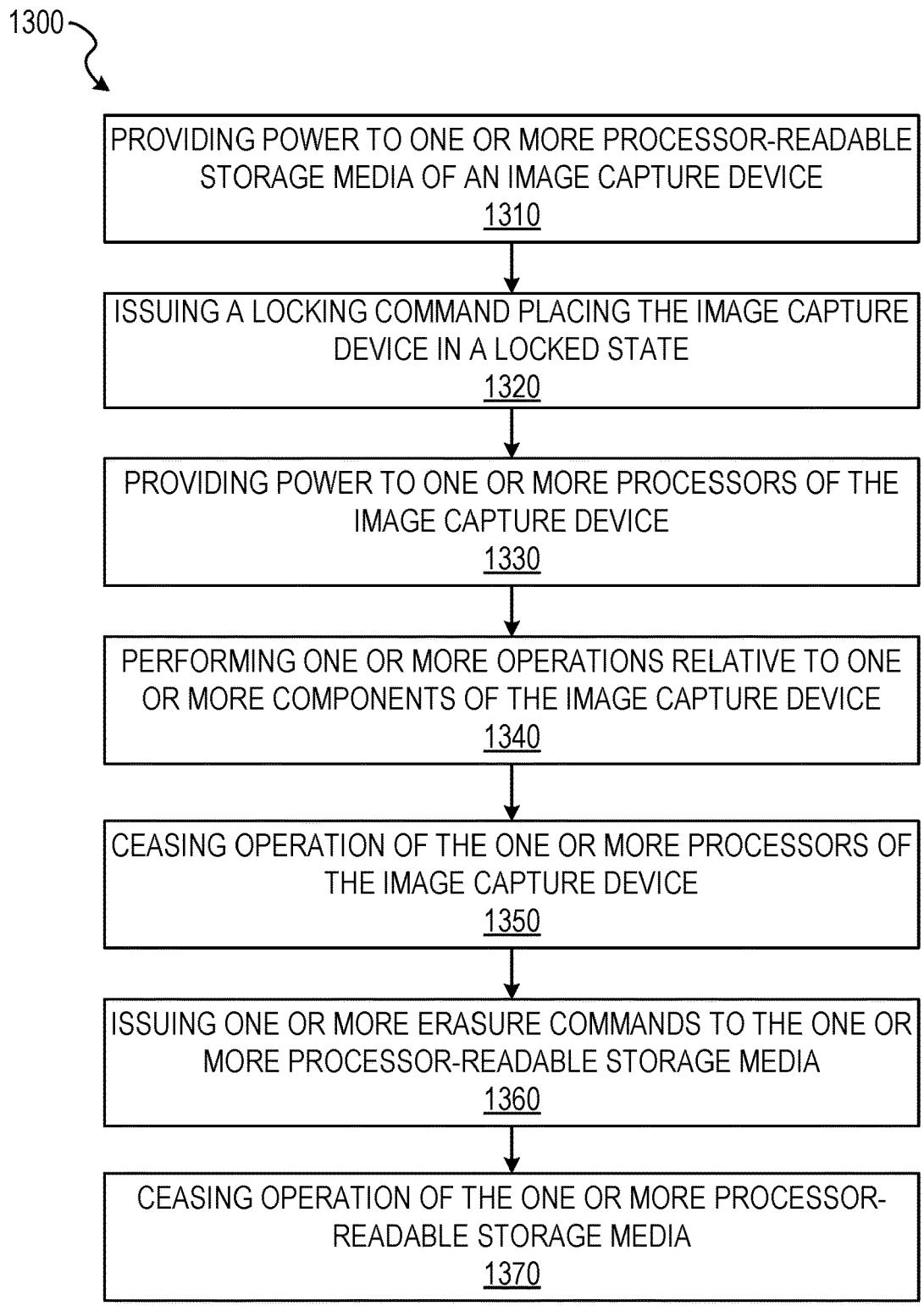
FIG. 13 is a flow diagram illustrating an example method for selectively securing an image capture device, according to some example embodiments.

FIG. 13 depicts a flow diagram illustrating an example method 1300 for selectively securing an image capture device, according to some example embodiments. The operations of the method 1300 may be performed by components of the image capture device 100, and are so described below for purposes of illustration. In some embodiments, a portion of the operations of the method 1300 may be performed during a boot or powering process for the image capture device 100, while a portion of the operations are performed during a shut-down or turning off procedure of the image capture device 100. For example, operations 1310-1330 may be performed during a booting process for the image capture device 100. Operations 1350-1370 may be performed during a shut-down or turning off procedure for the image capture device 100.

In operation 1310, power is provided to one or more processor-readable storage media. In some embodiments, the one or more processor-readable storage media comprise one or more of an embedded multimedia card (eMMC), a solid-state drive (SSD), random-access memory (RAM), or any other suitable data storage component within the image capture device 100. Power may be provided to the one or more processor-readable storage media during a powering or booting process of the image capture device 100. For example, power may be provided to the one or more processor-readable storage media in response to interaction with a power button or component of the image capture device 100, selected to turn on the image capture device 100. In some instances, power-up or boot-up may be initiated automatically in response to a decision made automatically by a microcontroller. The microcontroller may be configured to perform or include permissions to make decisions or determinations about when to boot up a system (e.g., the image capture device 100).

In embodiments where at least one of the one or more processor-readable storage media is an eMMC device, the eMMC device may enable write protection (e.g., a write-protect state) which precludes writing data to the eMMC device. The eMMC device may be configured to enable the write protection on a specified portion of the eMMC device or an entirety of the eMMC device. The write protection may be disabled by operation of the locking component 130 in response to interaction with the control component 140 to place the image capture device 100 into the capture state (e.g., an unlocked state).

In operation 1320, the locking component 130 issues a locking command, placing the image capture device 100 in a locked state. In response to power being supplied to the one or more processor-readable storage media, the locking component 130 may be configured to automatically issue the locking command. The locking command may be a "power-on Write Protect" command issued to the one or more processor-readable storage media. In some embodiments, the locking command includes a protected address or protected address range for at least a portion of the one or more processor-readable storage media. The protected address range may correspond to at least a portion of the available data storage area of the one or more processor-readable storage media. For example, in some instances, the protected address range comprises the entire range of data storage locations within the one or more processor-readable storage media.

In operation 1330, power is provided to one or more processors of the image capture device 100. Once the locking command is issued to the one or more processor-readable storage media, the image capture device 100 may transfer or provide power to the one or more processors. The one or more processors may be wired or otherwise configured within the image capture device 100 to prevent the one or more processors from accessing or otherwise affecting a reset pin or other physical write protection components of the one or more processor-readable storage media. Once power is provided to the one or more processors, the image capture device 100 may be booted for operation and interaction by a user.

In operation 1340, the one or more processors perform one or more operations relative to one or more components of the image capture device 100. The one or more operations may be any suitable operations of the image capture device 100. For example, the one or more processors may perform additional boot operations, access or initialize one or more components (e.g., the image capture component 120, the power source 150, the timing component 160, the audio capture component 180, and the capture state display 190), present information to a user of the image capture device 100, receive signals or data from one or more of the components of the image capture device 100, or any other suitable operation. While the image capture device 100 is in the locked state, in response to the locking command from the locking component 130, the one or more processors may be prevented from writing to or transferring information for storage on the one or more processor-readable storage media.

In some embodiments, in response to interaction with the control component 140, the locking component 130 issues an unlock command to the one or more processor-readable storage media. The locking component 130 may issue the unlock command to the power source 150 or the one or more processors in addition to the one or more processor-readable storage media. In some instances, the unlock command performs a power cycling operation, resetting at least a portion of the components of the image capture device 100. The power cycling and the unlock command may cause or allow the one or more processor-readable storage media to enter a writing state and the image capture device 100 to enter the capture state. Such a state change may enable the one or more processors to transmit, pass, or otherwise write data to the one or more processor-readable storage media.

In operation 1350, the one or more processors cease operation. The one or more processors may cease operation in response to interaction with the power button of the image capture device 100. In some instances, the one or more processors may cease operation automatically in response to a decision made automatically by a microcontroller. The microcontroller may be configured to make decisions about when to booth up the system (e.g., the image capture device 100). The one or more processors may cease operation regardless of whether the image capture device 100 is periodically or temporarily placed in the capture state after detecting the interaction with the power button.

In operation 1360, the locking component 130 issues one or more erasure commands to the one or more processor-readable storage media. The one or more erasure commands may comprise instructions to explicitly erase at least a portion of the contents of the one or more processor-readable storage media. For example, where the one or more processor-readable storage media comprise RAM, the one or more erasure commands may cause the RAM to be purged or otherwise to erase the entire contents of the RAM. The purging or erasure may prevent exfiltration of sensitive data from a cold-boot attack. Further, when initially providing power to the one or more processor-readable storage media, the image capture device 100 may be configured to explicitly erase data from the one or more processor-readable storage media or caches located thereon, to prevent cold-boot attacks. In some instances, when initially providing power to the one or more processors in operation 1330, the image capture device 100 may be configured to explicitly erase data from all of the caches located within the one or more processors included within the image capture device 100. The erasure of caches may prevent cold-boot attacks involving the processor cache itself.

In operation 1370, the one or more processor-readable storage media cease operation. Once the erasure commands have been issued and the appropriate data has been purged, explicitly erased, overwritten, or otherwise removed from the one or more processor-readable storage media, the one or more processor-readable storage media may cease operation. In some instances, cessation of operation of the one or more processor-readable storage media may include removal of power from the one or more processor-readable storage media.

Software Architecture

Figure 14:
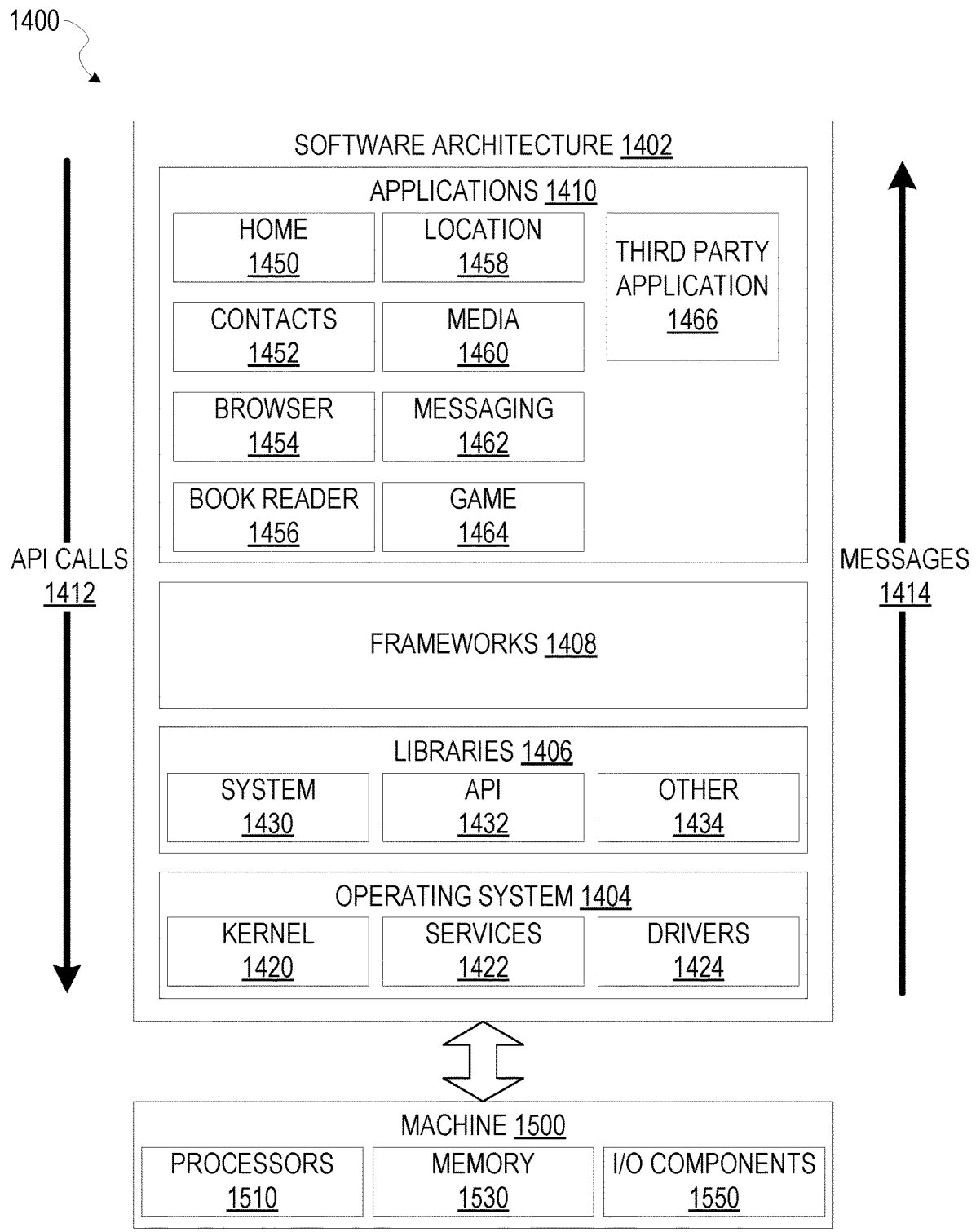
FIG. 14 is a block diagram illustrating an example of a software architecture that may be installed on a machine, according to some example embodiments.

FIG. 14 is a block diagram 1400 illustrating an architecture of software 1402, which can be installed on the devices described above. FIG. 14 is merely a non-limiting example of a software architecture, and it will be appreciated that many other architectures can be implemented to facilitate the functionality described herein. In various embodiments, the software 1402 is implemented by hardware such as machine a 1500 of FIG. 15 that includes processors 1510, memory 1530, and I/O components 1550. In this example architecture, the software 1402 can be conceptualized as a stack of layers where each layer may provide a particular functionality. For example, the software 1402 includes layers such as an operating system 1404, libraries 1406, frameworks 1408, and applications 1410. Operationally, the applications 1410 invoke application programming interface (API) calls 1412 through the software stack and receive messages 1414 in response to the API calls 1412, consistent with some embodiments.

In various implementations, the operating system 1404 manages hardware resources and provides common services. The operating system 1404 includes, for example, a kernel 1420, services 1422, and drivers 1424. The kernel 1420 acts as an abstraction layer between the hardware and the other software layers consistent with some embodiments. For example, the kernel 1420 provides memory management, processor management (e.g., scheduling), component management, networking, and security settings, among other functionality. The services 1422 can provide other common services for the other software layers. The drivers 1424 are responsible for controlling or interfacing with the underlying hardware, according to some embodiments. For instance, the drivers 1424 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1406 provide a low-level common infrastructure utilized by the applications 1410. The libraries 1406 can include system libraries 1430 (e.g., C standard library) that can provide functions such as memory allocation functions, string manipulation functions, mathematic functions, and the like. In addition, the libraries 1406 can include API libraries 1432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive: Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1406 can also include a wide variety of other libraries 1434 to provide many other APIs to the applications 1410.

The frameworks 1408 provide a high-level common infrastructure that can be utilized by the applications 1410, according to some embodiments. For example, the frameworks 1408 provide various graphic user interface (GUI) functions, high-level resource management, high-level location services, and so forth. The frameworks 1408 can provide a broad spectrum of other APIs that can be utilized by the applications 1410, some of which may be specific to a particular operating system or platform.

In an example embodiment, the applications 1410 include a home application 1450, a contacts application 1452, a browser application 1454, a book reader application 1456, a location application 1458, a media application 1460, a messaging application 1462, a game application 1464, and a broad assortment of other applications such as a third party application 1466. According to some embodiments, the applications 1410 are programs that execute functions defined in the programs. Various programming languages can be employed to create the applications 1410, structured in a variety of manners, such as object-oriented programming languages (e.g., Objective-C, Java, or C++) or procedural programming languages (e.g., C or assembly language). In a specific example, the third party application 1466 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating systems. In this example, the third party application 1466 can invoke the API calls 1412 provided by the operating system 1404 to facilitate functionality described herein.

Example Machine Architecture and
Machine-Readable Medium

Figure 15:
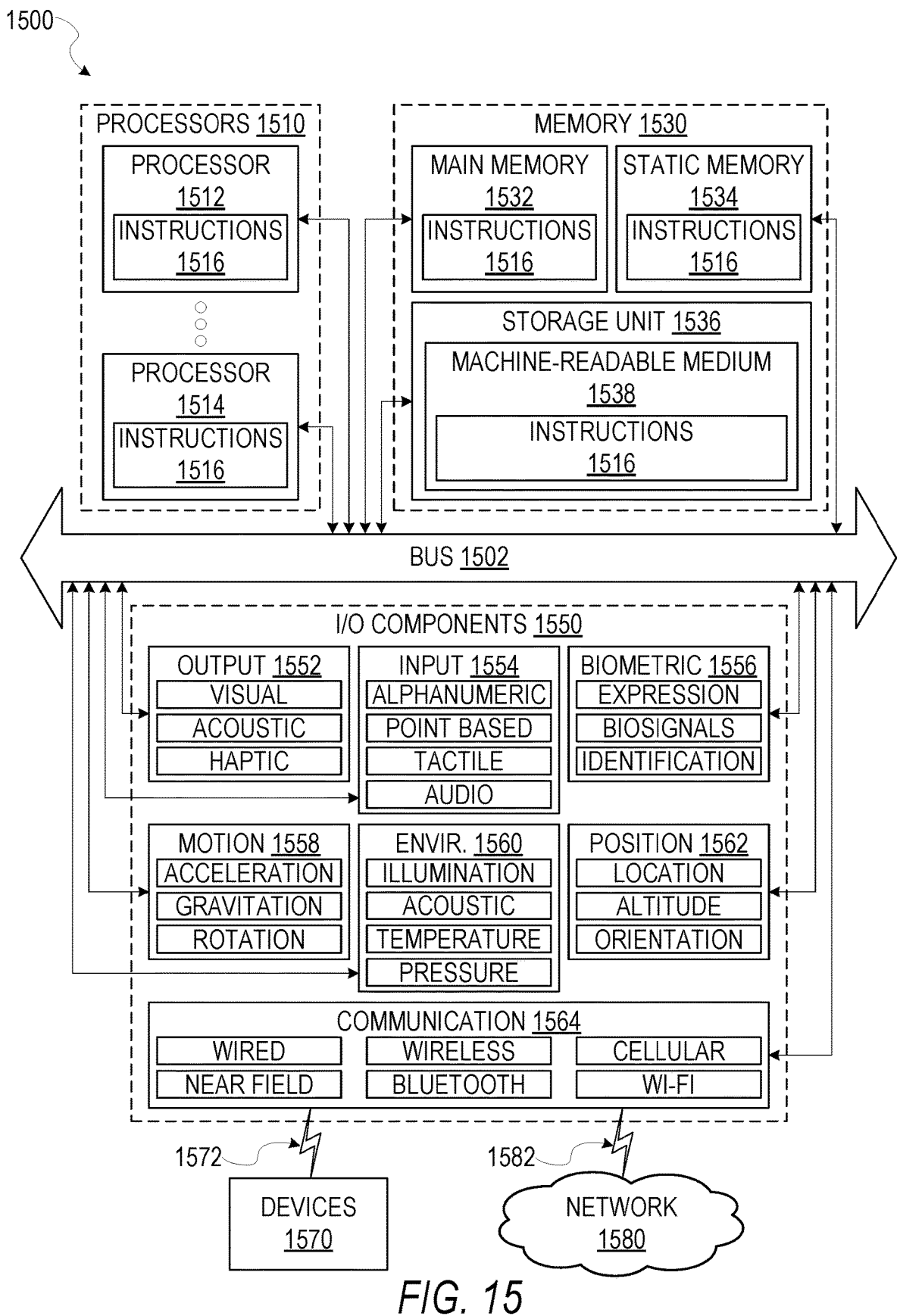
FIG. 15 is a block diagram presenting a diagrammatic representation of a machine in the form of a computer system within which a set of instructions may be executed for causing the machine to perform any of the methodologies discussed herein, according to an example embodiment.

FIG. 15 is a block diagram illustrating components of a machine 1500, according to some embodiments, able to read instructions (e.g., processor executable instructions) from a machine-readable medium (e.g., a non-transitory machine-readable storage medium) and perform any of the methodologies discussed herein. In some embodiments, the machine 1500 corresponds to the image capture device 100 or portions thereof. For example, one or more components of the image capture device 100 may be implemented using portions or components of the machine 1500 described below. Specifically, FIG. 15 shows a diagrammatic representation of the machine 1500 in the example form of a computer system, within which instructions 1516 (e.g., software, a program, an application, an apples, an app, or other executable code) for causing the machine 1500 to perform any of the methodologies discussed herein can be executed. In alternative embodiments, the machine 1500 operates as a standalone device or can be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1516, sequentially or otherwise, that specify actions to be taken by the machine 1500. Further, while only a single machine 1500 is illustrated, the term "machine" shall also be taken to include a collection of machines 1500 that individually or jointly execute the instructions 1516 to perform any of the methodologies discussed herein.

In various embodiments, the machine 1500 comprises processors 1510, memory 1530, and I/O components 1550, which can be configured to communicate with each other via a bus 1502. The components of the machine 1500 described herein may correspond, represent, or comprise at least a portion of the components of the image capture device 100 described above. In an example embodiment, the processors 1510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 1512 and a processor 1514 that may execute the instructions 1516. The term "processor" is intended to include multi-core processors that may comprise two or more independent processors (also referred to as "cores") that can execute instructions 1516 contemporaneously. Although FIG. 15 shows multiple processors 1510, the machine 1500 may include a single processor with a single core, a single processor with multiple cores (e.g., a multi-core processor), multiple processors with a single core, multiple processors with multiples cores, or any combination thereof.

The memory 1530 comprises a main memory 1532, a static memory 1534, and a storage unit 1536 accessible to the processors 1510 via the bus 1502, according to some embodiments. The storage unit 1536 can include a machine-readable medium 1538 on which are stored the instructions 1516 embodying any of the methodologies or functions described herein. The instructions 1516 can also reside, completely or at least partially, within the main memory 1532, within the static memory 1534, within at least one of the processors 1510 (e.g., within the processor's cache memory), or any suitable combination thereof, during execution thereof by machine 1500. Accordingly, in various embodiments, the main memory 1532, the static memory 1534, and the processors 1510 are considered machine-readable media 1538.

As used herein, the term "memory" refers to a machine-readable medium 1538 able to store data temporarily or permanently and may be taken to include, but not be limited to, random-access memory (RAM), read-only memory (ROM), buffer memory, flash memory, and cache memory. While the machine-readable medium 1538 is shown in an example embodiment to be a single medium, the term "machine-readable medium" should be taken to include a single medium or multiple media (e.g., a centralized or distributed database, or associated caches and servers) able to store the instructions 1516. The term "machine-readable medium" shall also be taken to include any medium, or combination of multiple media, that is capable of storing instructions (e.g., instructions 1516) for execution by a machine (e.g., machine 1500), such that the instructions, when executed by processors of the machine 1500 (e.g., processors 1510), cause the machine 1500 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1550 include a wide variety of components to receive input, provide output, produce output, transmit information, exchange information, capture measurements, and so on. In general, it will be appreciated that the I/O components 1550 can include many other components that are not shown in FIG. 15. The I/O components 1550 are grouped according to functionality merely for simplifying the following discussion, and the grouping is in no way limiting. In various example embodiments, the I/O components 1550 include output components 1552 and input components 1554. The output components 1552 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1554 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1550 include biometric components 1556, motion components 1558, environmental components 1560, or position components 1562, among a wide array of other components. For example, the biometric components 1556 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1558 include acceleration sensor components (e.g., accelerometer), gravitation sensor components, rotation sensor components (e.g., gyroscope), and so forth. The environmental components 1560 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1562 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1550 may include communication components 1564 operable to couple the machine 1500 to a network 1580 or devices 1570 via a coupling 1582 and a coupling 1572, respectively. For example, the communication components 1564 include a network interface component or another suitable device to interface with the network 1580. In further examples, communication components 1564 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1570 may be another machine or any of a wide variety of peripheral devices (e.g., a peripheral device coupled via a Universal Serial Bus (USB)).

Moreover, in some embodiments, the communication components 1564 detect identifiers or include components operable to detect identifiers. For example, the communication components 1564 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1564, such as location via Internet Protocol (IP) geo-location, location via WI-FI® signal triangulation, location via detecting a BLUETOOTH® or NFC beacon signal that may indicate a particular location, and so forth.

Transmission Medium

In various example embodiments, portions of the network 1580 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1580 or a portion of the network 1580 may include a wireless or cellular network, and the coupling 1582 may be a Code Division Multiple Access (CDMA) connection, a Global System for Mobile communications (GSM) connection, or another type of cellular or wireless coupling. In this example, the coupling 1582 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1516 are transmitted or received over the network 1580 using a transmission medium via a network interface device (e.g., a network interface component included in the communication components 1564) and utilizing any one of a number of well-known transfer protocols (e.g., Hypertext Transfer Protocol (HTTP)). Similarly, in other example embodiments, the instructions 1516 are transmitted or received using a transmission medium via the coupling 1572 (e.g., a peer-to-peer coupling) to the devices 1570. The term "transmission medium" shall be taken to include any intangible medium that is capable of storing, encoding, or carrying the instructions 1516 for execution by the machine 1500, and includes digital or analog communications signals or other intangible media to facilitate communication of such software.

Furthermore, the machine-readable medium 1538 is non-transitory (in other words, not having any transitory signals) in that it does not embody a propagating signal. However, labeling the machine-readable medium 1538 "non-transitory" should not be construed to mean that the medium is incapable of movement; the medium should be considered as being transportable from one physical location to another. Additionally, since the machine-readable medium 1538 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single embodiment or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A securable image capture device, comprising:
a housing defining an imaging aperture;
an image capture component coupled to the housing and aligned with the imaging aperture, the image capture component configured to capture image data of a field of view aligned with the imaging aperture;
a storage component;
a locking component coupled to the storage component, the locking component modifying a write-protect state of the storage component to selectively enable image storage responsive to a selection releasing the locking component;
a control component coupled to the locking component, interaction with the control component comprising the selection releasing the locking component and triggering modification of the write-protect state of the storage component;
an audio capture component coupled to the housing and aligned with the audio aperture, the audio capture component configured to capture audio data responsive to a record state triggered by the locking component upon release of the write-protect state; and
a timing component configured to trigger the locking component to revert the record state of the audio capture component to prevent capture of audio data after exhaustion of a predetermined period of time, the predetermined period of time initiated in response to the interaction with the control component.

2. The securable image capture device of claim 1, wherein the housing comprises:
a frame defining one or more optical element areas configured to receive respective optical elements for viewing by a user in a viewing direction including at least a portion of the field of view of the image capture component;
an elongate temple movably coupled to the frame for aligning the frame in a defined position while worn by the user; and
wherein the image capture component is coupled to the housing with the image capture component and the imaging aperture aligned with the viewing direction of the optical elements.

3. The securable image capture device of claim 1, wherein releasing the write-protect state corresponds to an unlocked state of the image capture component.

4. The securable image capture device of claim 1, wherein the storage component is an embedded multimedia card (eMMC) device.

5. The securable image capture device of claim 1 further comprising:
a capture state display coupled to the image capture component, the capture state display causing presentation of an indicator representing release of the write-protect state.

6. The securable image capture device of claim 5, wherein the capture state display receives a signal from the image capture component in response to the image capture component capturing image data.

7. The securable image capture device of claim 5, wherein the capture state display is incorporated into an augmented reality (AR) display.

8. The securable image capture device of claim 7, wherein the AR display is configured to generate an AR element, the AR element corresponding to a capture state of the image capture device.

9. The securable image capture device of claim 1, wherein the storage component is configured to enable the write-protect state on a portion of the storage component.

10. The securable image capture device of claim 1, wherein the selection releasing the locking component is received from a physically accessible component selectable by a user.

11. The securable image capture device of claim 1, wherein the locking component is configured to automatically issue a locking command, the locking command comprising a protected address range for the storage component.

12. The securable image capture device of claim 11, wherein the protected address range for the storage component corresponds to an available data storage area of the storage component.

13. The securable image capture device of claim 1, wherein the triggering of the locking component by the timing component is based on active usage of the image capture component.

14. The securable image capture device of claim 1, wherein the triggering of the locking component by the timing component is based on active usage of the audio capture component.

* * * * *